US009439173B2

(12) United States Patent
Yi et al.

(10) Patent No.: US 9,439,173 B2
(45) Date of Patent: Sep. 6, 2016

(54) METHOD AND APPARATUS FOR TRANSMITTING DATA

(71) Applicant: LG ELECTRONICS INC., Seoul (KR)

(72) Inventors: Yunjung Yi, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/399,081

(22) PCT Filed: May 6, 2013

(86) PCT No.: PCT/KR2013/003911

§ 371 (c)(1),
(2) Date: Nov. 5, 2014

(87) PCT Pub. No.: WO2013/168942

PCT Pub. Date: Nov. 14, 2013

(65) Prior Publication Data

US 2015/0110033 A1 Apr. 23, 2015

Related U.S. Application Data

(60) Provisional application No. 61/643,333, filed on May 6, 2012.

(51) Int. Cl.

*H04W 72/04* (2009.01)
*H04L 1/00* (2006.01)

(Continued)

(52) U.S. Cl.

CPC ............ *H04W 72/04* (2013.01); *H04L 1/0025* (2013.01); *H04L 5/0048* (2013.01);

(Continued)

(58) Field of Classification Search

CPC ..... H04L 1/00; H04L 1/0025; H04L 1/1671; H04L 5/0048; H04L 5/005; H04L 5/0051; H04L 5/0053; H04L 5/0091; H04L 27/2613; H04W 72/04; H04W 72/042; H04W 72/0446; H04W 72/0453; H04W 72/048; H04W 84/10

See application file for complete search history.

(56) References Cited

U.S. PATENT DOCUMENTS

2008/0232325 A1* 9/2008 Mehta .................... H04B 7/061 370/332
2011/0317610 A1 12/2011 Park et al.

(Continued)

FOREIGN PATENT DOCUMENTS

KR 10-2010-0099655 A 9/2010
KR 10-2011-0046371 A 5/2011

(Continued)

OTHER PUBLICATIONS

Samsung, "Performance evaluation of enhanced control channel based on UE-specific reference signaling," 3GPP TSG RAN WG1 #67, R1-114240, San Francisco, USA, Nov. 14-18, 2011, pp. 1-7.

(Continued)

*Primary Examiner* — Khoa Huynh

(74) *Attorney, Agent, or Firm* — Birch, Stewart, Kolasch & Birch, LLP

(57) ABSTRACT

The present invention relates to a method and apparatus for transmitting data. The method for a terminal to receive downlink data includes the steps of: receiving resource allocation information from a base station; and demodulating the downlink data transmitted through a sub-resource allocation unit allocated on the basis of the resource allocation information, wherein the sub-resource allocation unit is a plurality of resource units included in one resource allocation unit and the downlink data can be demodulated on the basis of a demodulation reference signal (DM_RS).

6 Claims, 16 Drawing Sheets

Time
Frequency
0.5ms Subframe 0.5ms Subframe
Subframe (1ms)
PRB_P0 (1200) PRB_P1 (1220) PRB_P2 (1240) PRB_P3 (1260)

(51) Int. Cl.
*H04L 5/00* (2006.01)
*H04L 27/26* (2006.01)
*H04W 84/10* (2009.01)
*H04L 1/16* (2006.01)

(52) U.S. Cl.
CPC .......... *H04L 5/0053* (2013.01); *H04L 5/0091* (2013.01); *H04L 27/2613* (2013.01); *H04L 1/1671* (2013.01); *H04W 72/042* (2013.01); *H04W 84/10* (2013.01)

(56) References Cited

U.S. PATENT DOCUMENTS

2012/0218964 A1 8/2012 Park et al.
2012/0282936 A1* 11/2012 Gao .................... H04L 5/0023 455/450
2012/0287848 A1 11/2012 Kim et al.
2014/0321421 A1* 10/2014 Popovic ................ H04L 5/0051 370/330

FOREIGN PATENT DOCUMENTS

KR 10-2011-0088432 A 8/2011
WO WO 2010/117240 A2 10/2010
WO WO 2011/021852 A2 2/2011
WO WO 2012/149651 A1 11/2012

OTHER PUBLICATIONS

Sharp, "Partitioning of PRB pair and eCCE structure," 3GPP TSG RAN WG1 Meeting #68, R1-120281, Dresden, Germany, Feb. 6-10, 2012, pp. 1-8.
LG Electronics, "Discussions on DMRS Configuration for CoMP," 3GPP TSG RAN WG1 Meeting #67, R1-113984, San Francisco, USA, Nov. 14-18, 2011 (downloaded by EPO on Nov. 8, 2011), XP50562024A, pp. 1-3.
Samsung, "DMRS Scrambling for Enhanced Control Channels," 3GPP TSG RAN WG1 #68, R1-120188, Dresden, Germany, Feb. 6-10, 2012 (downloaded by EPO on Jan. 31, 2012), XP50562753A, pp. 1-5.

* cited by examiner

PCFICH

PHICH

PDSCH

PDCCH region

One resource-block pair
VRBs
PRBs
0 1 2 3 4 5 6 7 8 9 10 11 12 13 14 15 16 17 18 19 20 21 22 23 24
Direct VRB-to-PRB mapping
(A)
RB pair interleaving
RB distribution
Gap (12 for 25 RB bandwidth)
(B)

METHOD AND APPARATUS FOR TRANSMITTING DATA

CROSS REFERENCE TO RELATED APPLICATIONS

This application is the National Phase of PCT International Application No. PCT/KR2013/003911, filed on May 6, 2013, which claims priority under 35 U.S.C. 119(e) to U.S. Provisional Application No. 61/643,333, filed on May 6, 2012, all of which are hereby expressly incorporated by reference into the present application.

BACKGROUND OF THE INVENTION

1. Field of the Invention

The present invention relates to wireless communication and, more particularly, to a method and apparatus for transmitting data.

2. Related Art

Today, Machine to Machine (M2M) or Internet of Things (IoT) is emerging as a primary issue of the next generation communication market. M2M/IoT technology allows objects in the everyday environment to be connected to one another through a network and enables people to obtain and deliver necessary information anytime and anywhere, based on which various kinds of new services can be provided. Networks of sensors operating within a limited area and Radio Frequency Identification (RFID) systems formed the initial implementation of the M2M technology. Taking into account mobility of objects, a broad service coverage including the seaside as well as islands and mountainous regions, convenience of network operation and maintenance, security for highly reliable data transmission, and guaranteed service quality, public interest in the M2M communication based on a mobile communication network is getting higher.

The 3GPP, the standard development body for mobile communication technology standards headquartered in Europe, is also operating a standardization process in its full capacity since 2008 under the title of "Machine Type Communication (MTC)", originating from a feasibility study on the M2M communication at 2005.

From the perspective of the 3GPP standard, a "machine" refers to an object which does not require direct control or intervention of a human, and the "MTC" is defined as one form of data communication consisting of one or more machines.

The 3GPP refers to smart meters, vending machines, and others equipped with a mobile communication module as typical examples of the machine. Due to the advent of smart phones capable of connecting to a network automatically and performing communication without a user's operation or intervention depending on the user's location or circumstances, mobile terminals having an MTC function is also considered as one form of the machine. MTC devices in the form of micro-sensors based on the IEEE 802.15 WPAN (Wireless Personal Area Network) or gateways connected to RFID devices also belong to the family of the machine.

To accommodate a multitude of MTC devices transmitting and receiving a small amount of data, the mobile communication network of today requires identifiers and an address system different from the existing ones, and there may need a new mechanism taking into account communication and cost issues.

SUMMARY OF THE INVENTION

One object of the present invention is to provide a method for transmitting and receiving data.

Another object of the present invention is to provide an apparatus for transmitting and receiving data.

To achieve the object described above, a method for a terminal to receive downlink data according to one aspect of the present invention comprises receiving resource allocation information from a base station; and demodulating the downlink data transmitted through a sub-resource allocation unit allocated on the basis of the resource allocation information, where the sub-resource allocation unit is a plurality of resource units included in one resource allocation unit and the downlink data can be demodulated on the basis of a Demodulation Reference Signal (DM-RS). The pattern of the DM-RS can be determined in accordance with the sub-resource allocation unit.

To achieve the another object described above, a terminal according to another aspect of the present invention comprises a processor configured to receive resource allocation information from a base station and to demodulate downlink data transmitted through a sub-resource allocation unit allocated on the basis of the resource allocation information, where the sub-resource allocation unit is a plurality of resource units included in one resource allocation unit and the downlink data can be demodulated on the basis of a DM-RS. The pattern of the DM-RS can be determined in accordance with the sub-resource allocation unit.

The present invention improves a data transmission efficiency of a base station.

DESCRIPTION OF EXEMPLARY EMBODIMENTS

A wireless device may be fixed or mobile. The term such as User equipment (UE), Mobile Station (MS), Mobile Terminal (MT), User Terminal (UT), Subscriber Station (SS), Personal Digital Assistant (PDA), wireless modem, handheld device, and terminal can also be used to refer to the wireless device. In some cases, a wireless device may refer to a device capable of data communication only, such as a Machine-Type Communication (MTC) device.

A Base Station (BS) usually refers to a fixed station performing communication with wireless devices and may be called an evolved-NodeB (eNB), a Base Transceiver System (BTS), or an Access Point (AP).

In what follows, it is assumed that the present invention is compliant with the 3GPP LTE based on the 3GPP Technical Specification (TS) Release 8 or the 3GPP LTE-A based on the 3GPP TS Release 10. However, it should be noted that the assumption is introduced only for the purpose of illustration and the present invention can be applied to various types of wireless communication networks. In the following, the term of LTE refers to the LTE or the LTE-A or both.

Figure 1:
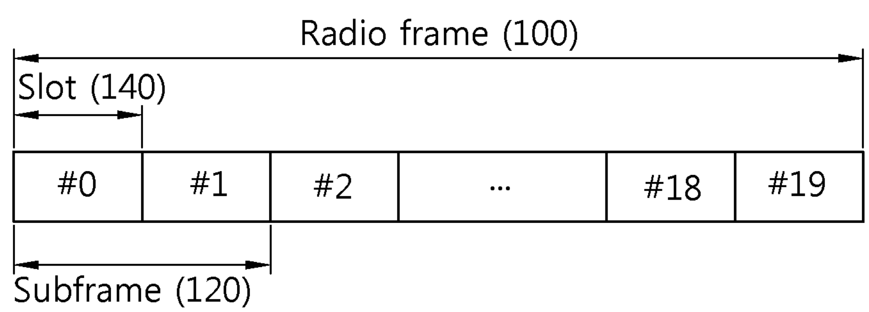
FIG. 1 illustrates a structure of a radio frame in the 3$^{rd}$ Generation Partnership Project (3GPP) Long Term Evolution (LTE) specifications.

FIG. 1 illustrates a structure of a radio frame in the 3rd Generation Partnership Project (3GPP) Long Term Evolution (LTE) specifications.

In the 3GPP LTE specification, the structure of a radio frame 100 can reference the Clause 5 of 3GPP TS 36.211 V8.2.0 (March 2008) "Technical Specification Group Radio Access Network; Evolved Universal Terrestrial Radio Access (E-UTRA); Physical channels and modulation (Release 8)". With reference to FIG. 1, a radio frame 100 comprises 10 subframes 120, and one subframe 120 consists of two slots 140. The radio frame 100 is indexed according to the slot 140 ranging from slot #0 to slot #19, or indexed according to the subframe ranging from subframe #0 to subframe #9. The subframe #0 may include slot #0 and slot #1.

The time interval required to transmit a single subframe 120 is called a Transmission Time Interval (TTI). TTI can be used as a scheduling unit for data transmission. For example, the length of one radio frame 100 may amount to 10 ms; the length of one subframe 120, 1 ms; and the length of one slot 140, 0.5 ms.

One slot 140 comprises a plurality of Orthogonal Frequency Division Multiplexing (OFDM) symbols in the time domain and a plurality of subcarriers in the frequency domain. An OFDM symbol is intended to represent one symbol period as OFDMA is used for downlink transmission in the 3GPP LTE standard and can be called a different name according to a multiple access method. For example, in case Single Carrier-Frequency Division Multiple Access (SC-FDMA) is used to implement a uplink multiple access method, the OFDM symbol may be called an SC-FMDA symbol. A Resource Block (RB) is a resource allocation unit and comprises a plurality of consecutive subcarriers in one slot. Specifics of an RB are provided in FIG. 2. The structure of a radio frame 100 disclosed in FIG. 1 is just an embodiment of a frame structure. In other words, a new radio frame format can be defined by changing the number of subframes 120 included in the radio frame 100, the number of slots included in the subframe 120, or the number of OFDM symbols included in the slot 140.

The 3GPP LTE standard defines 7 OFDM symbols for one slot in the case of a normal Cyclic Prefix (CP) while 6 OFDM symbols are defined for one slot in the case of an extended CP.

Wireless communication systems can be divided largely into Frequency Division Duplex (FDD)-based systems and Time Division Duplex (TDD)-based systems. In the FDD mode, uplink transmission and downlink transmission are carried out separately in the respective frequency bands. On the other hand, for the TDD mode, uplink and downlink transmission are carried out separately in the time domain but occupy the same frequency band. Channel responses in the TDD mode are in fact reciprocal. This implies that a downlink channel response is virtually the same as the corresponding uplink channel response in the frequency domain. Therefore, it can be regarded as an advantage for a wireless communication system operating in the TDD mode that a downlink channel response can be obtained from a uplink channel response. Since the whole frequency domain is so utilized in the TDD mode that uplink and downlink transmission are performed in time division fashion, downlink transmission by a base station and uplink transmission by a UE cannot be performed simultaneously. In a TDD system where uplink and downlink transmission are managed in units of subframes, uplink and downlink transmission are carried out separately in the respective subframes.

Figure 2:
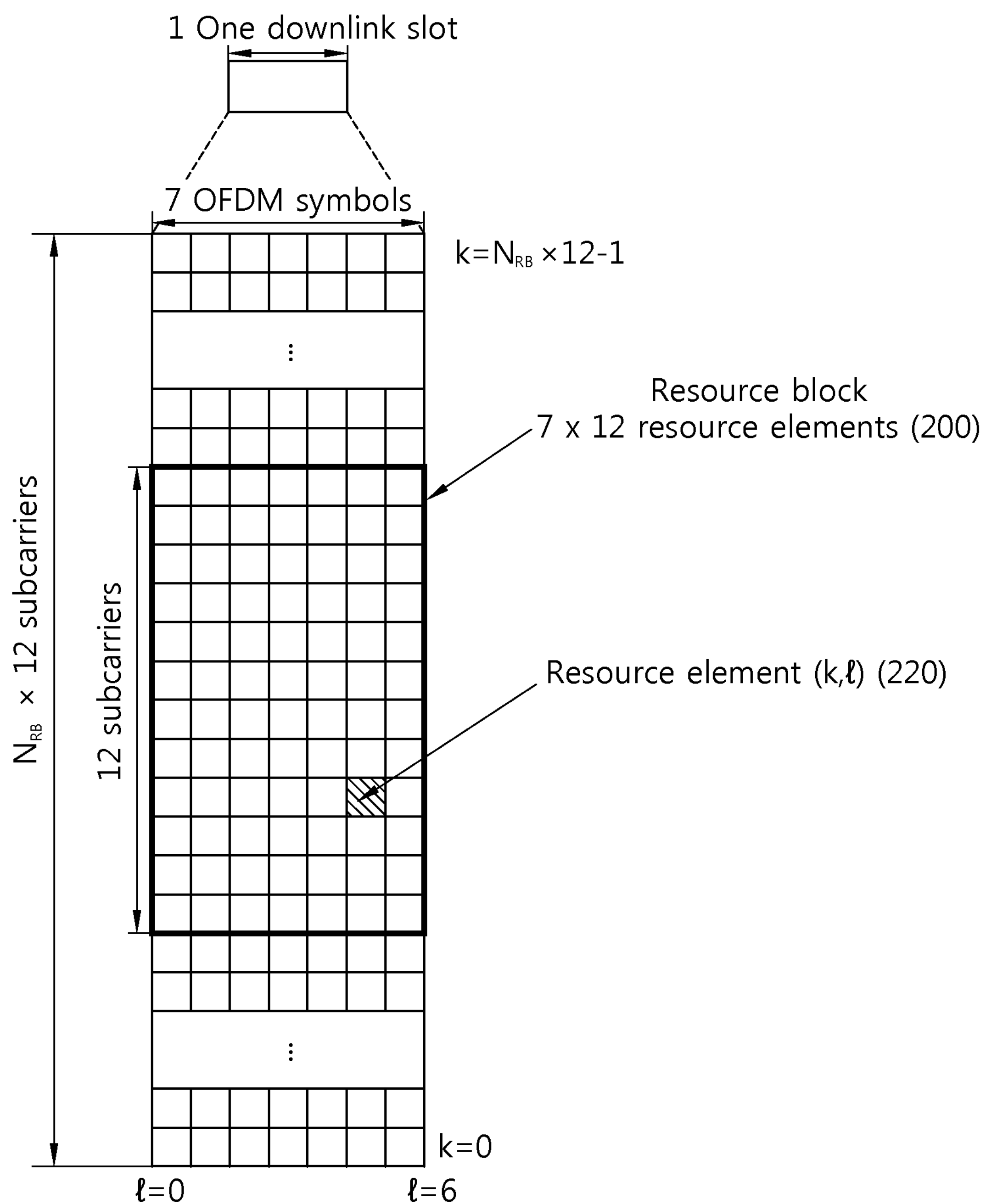
FIG. 2 illustrates one example of a resource grid with respect to a downlink slot.

FIG. 2 illustrates one example of a resource grid with respect to a downlink slot.

A downlink slot includes a plurality of OFDM symbols in the time domain and includes $N_{RB}$ Resource Blocks (RBs) in the frequency domain. The number of resource blocks included in a downlink slot, $N_{RB}$, is dependent on the downlink transmission bandwidth defined in a cell. For example, in the LTE system, $N_{RB}$ may correspond to one of numbers ranging from 6 to 110 according to the transmission bandwidth used. One resource block 200 includes a plurality of subcarriers in the frequency domain. The structure of a uplink slot can be the same as that of the downlink slot.

Each element of resource grids is called a resource element 220. A resource element 220 of resource grids can be identified by an index pair (k, l) within a slot. Here, k ($k=0, \ldots, N_{RB}\times 12-1$) stands for a subcarrier index in the frequency domain while l ($l=0, \ldots, 6$) an OFDM symbol index in the time domain.

Although it was assumed in FIG. 2 that one resource block 200 includes 7 OFDM symbols in the time domain and 7×12 resource elements 220 consisting of 12 subcarriers in the frequency domain, the number of OFDM symbols within the resource block 200 and the number of subcarriers are not limited to the above example. The number of OFDM symbols and the number of subcarriers may be changed in various ways depending on the length of CP, frequency spacing, and the like. For example, in the case of a normal CP, the number of OFDM symbols is 7 while 6 OFDM symbols are defined in the case of an extended CP. The number of subcarriers for a single OFDM symbol may assume one of 128, 256, 512, 1024, 1536, and 2048.

Figure 3:
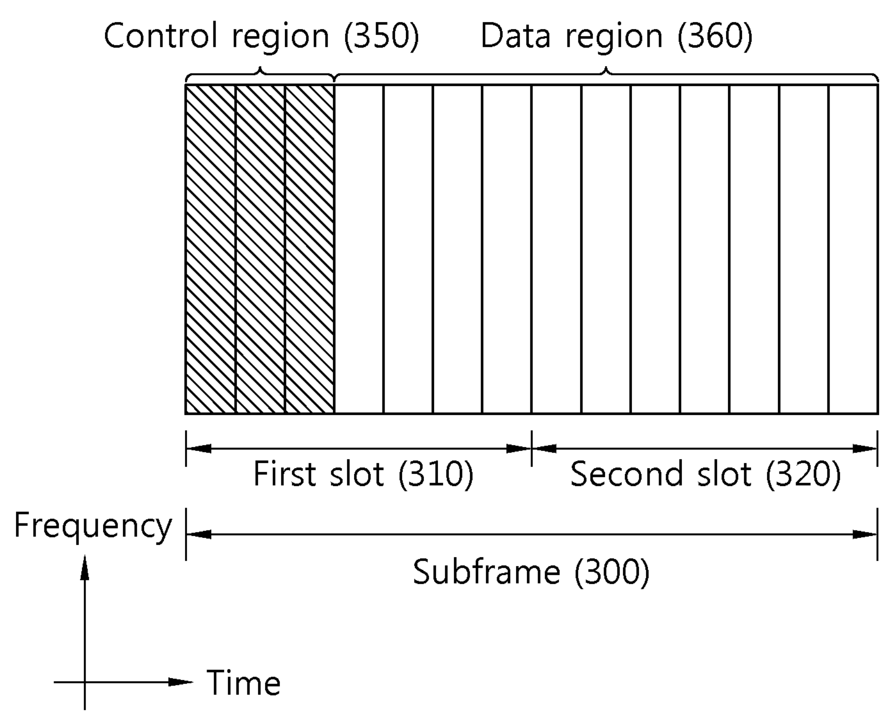
FIG. 3 illustrates a structure of a downlink subframe.

FIG. 3 illustrates a structure of a downlink subframe.

A downlink subframe 300 includes two slots 310, 320 in the time domain, and each slot 310, 320 includes 7 OFDM symbols in the case of a normal CP. A maximum of three preceding OFDM symbols (a maximum of four OFDM symbols for the case of 1.4 MHz bandwidth) of a first slot 310 within a subframe 300 corresponds to a control region 350 to which a control channel is allocated while the remaining OFDM symbols correspond to a data region 360 to which a Physical Downlink Shared Channel (PDSCH) is allocated.

A PDCCH is capable of resource allocation of a Downlink-Shared Channel (DL-SCH); transmission of a transmission format, resource allocation information of a Uplink Shared Channel (UL-SCH), paging information on a PCH, and system information on the DL-SCH; resource allocation of a upper layer control message such as a random access response transmitted on the PDSCH; and transmission of a set of transmission power control commands with respect to individual UEs within an arbitrary UE group, activation information of Voice over Internet Protocol (VoIP), and so on. A plurality of PDCCH regions can be defined within the control region 350, and a UE is capable of monitoring a plurality of PDCCHs. The PDCCH is transmitted onto the aggregation consisting of one or a few consecutive Control Channel Elements (CCEs). A CCE is a logical allocation unit used to provide the PDCCH with a coding rate according to the condition of a radio channel. A CCE corresponds to a plurality of resource element groups. Depending on a relationship between the number of CCEs and the coding rate provided by the CCEs, a PDCCH format and the number of bits available for the PDCCH are determined.

A base station determines the PDCCH format according to Downlink Control Information (DCI) to be sent to a UE and adds a Cyclic Redundancy Check (CRC) to the control information. The CRC is masked with a unique identifier depending on an owner of the PDCCH or intended use of the PDCCH, which is called a Radio Network Temporary Identifier (RNTI). In the case of a PDCCH intended for a particular UE, a unique identifier for the UE, for example, Cell-RNTI (C-RNTI) can be masked with the CRC. Similarly, the CRC can be masked with a paging identifier, for example, Paging-RNTI (P-RNTI) in the case of a PDCCH intended for a paging message. The CRC can be masked with a system information identifier, for example, System Information-RNTI (SI-RNTI) in the case of a PDCCH intended for system information block. The CRC can be masked with a Random Access-RNTI (RA-RNTI) to designate a random access response in response to transmission of a random access preamble of the UE.

Figure 4:
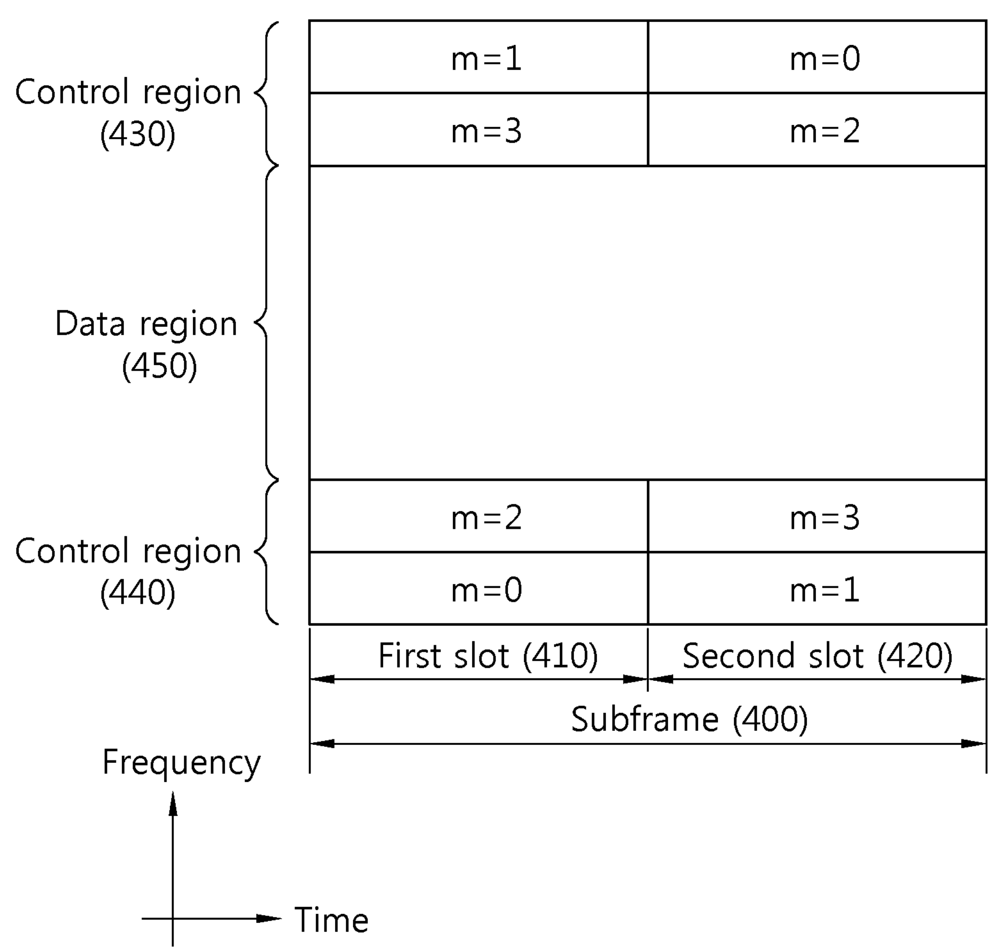
FIG. 4 illustrates a structure of a uplink subframe.

FIG. 4 illustrates a structure of a uplink subframe.

A uplink subframe can be divided into a control region 430, 440 and a data region 450 in the frequency domain. In the control region 430, 440, a Physical Uplink Control Channel (PUCCH) for transmitting uplink control information is allocated. A Physical Uplink Shared Channel (PUSCH) for transmitting data is allocated in the data region 450. If commanded by a upper layer, the UE is enabled to transmit the PUCCH and the PUSCH simultaneously.

A PUCCH associated with one UE is allocated to an RB pair in a subframe 400. Resource blocks belonging to an RB pair occupy subcarriers different from each other respectively in a first 410 and a second slot 420. The frequency band occupied by a resource block belonging to the RB pair allocated to the PUCCH is changed on the basis of a slot boundary. The RB pair allocated to the PUCCH as described above is then said to have frequency-hopped at the slot boundary. The UE can obtain frequency diversity gain by transmitting uplink control information through different subcarriers according as time passes.

The uplink control information transmitted on the PUCCH includes Hybrid Automatic Repeat reQuest (HARQ) Acknowledgement (ACK)/Non-acknowledgement (NACK), Channel Quality Indicator (CQI) indicating downlink channel status, Scheduling Request (SR) used to request allocation of uplink radio resources, and so on.

The PUSCH is mapped to a Uplink Shared Channel (UL-SCH) which is a transport channel. The uplink data transmitted onto the PUSCH may correspond to a transport block which is a data block used for the UL-SCH transmitted during a TTI. The transport block may contain user information. Or the uplink data may be multiplexed data. The transport block for the UL-SCH and the control information may have been multiplexed with each other to form the multiplexed data. For example, the control information multiplexed with the data may include CQI, Precoding Matrix Indicator (PMI), HARQ, Rank Indicator (RI), and so on. The uplink data may be comprised of only the control information.

Figure 5:
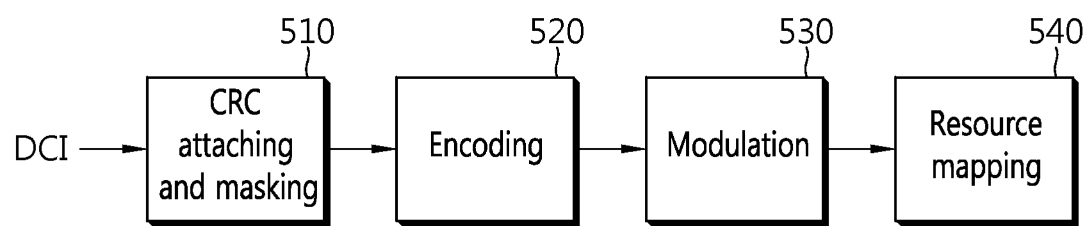
FIG. 5 is a block diagram illustrating a method for generating PDCCH data.

FIG. 5 is a block diagram illustrating a method for generating PDCCH data.

FIG. 5 describes in detail a method for generating PDCCH data.

The UE performs blind decoding for detection of a PDCCH. Blind decoding can be carried out on the basis of an identifier masked with CRC bits of a received PDCCH (which is called a candidate PDCCH). The UE checks a CRC error of received PDCCH data, thereby determining whether the received PDCCH data correspond to the control data of the UE.

The base station determines a PDCCH format according to the DCI to be sent to the UE, attaches CRC bits to the DCI, and masks the CRC bits by using a unique identifier (which is called a Radio Network Temporary Identifier (RNTI)) according to the owner or intended use of the PDCCH (block 510).

In the case of a PDCCH intended for a particular UE, a unique identifier of the UE, for example, CRC is masked with a Cell-RNTI (C-RNTI). Similarly, in the case of a PDCCH intended for a paging message, a paging indication identifier, for example, the CRC is masked by Paging-RNTI (P-RNTI). In the case of a PDCCH intended for system information, the CRC is masked by a system information identifier, System Information-RNTI (SI-RNTI). To indicate a random access response, which is a response to transmission of a random access preamble, the CRC is masked by a Random Access-RNTI (RA-RNTI). To indicate a Transmit Power Control (TPC) command with respect to a plurality of UEs, the CRC is masked by a TPC-RNTI.

If the C-RNTI is used, the PDCCH carries control information for the corresponding particular UE (which is called UE-specific control information); if a different type of RNTI other than the C-RNTI is used, the PDCCH carries common control information that all of the UEs or a plurality of UEs within a cell receive.

The base station generates coded data by encoding the DCI to which the CRC bits have been added (block 520). The encoding comprises channel encoding and rate matching.

The base station modulates coded data to generate modulation symbols (block 530).

The modulation symbols are mapped to physical Resource Elements (REs) (block 540). The modulation symbols can be mapped to the respective REs.

The control region within a subframe includes a plurality of Control Channel Elements (CCEs). A CCE is a logical allocation unit used to provide the PDCCH with a coding rate according to the condition of a radio channel and corresponds to a plurality of Resource Element Groups (REGs). An REG includes a plurality of resource elements. Depending on a relationship between the number of CCEs and the coding rate provided by the CCEs, a PDCCH format and the number of bits available for the PDCCH are determined.

One REG comprises four REs, and one CCE comprises nine REGs. To form one PDCCH, {1, 2, 4, 8} CCEs can be used, and each element of the set {1, 2, 4, 8} is called a CCE aggregation level.

The number of CCEs used for transmission of a PDCCCH is determined by the channel condition of a base station. For example, one CCE can be assigned for PDCCH transmission in the case of a wireless device with a good downlink channel condition. On the other hand, for the case of a wireless device with a poor downlink channel condition, eight CCEs can be used for PDCCH transmission.

A control channel consisting of one or more CCEs performs interleaving in units of REGs and is mapped to physical resources after cyclic shift is carried out on the basis of a cell identifier (ID).

Figure 6:
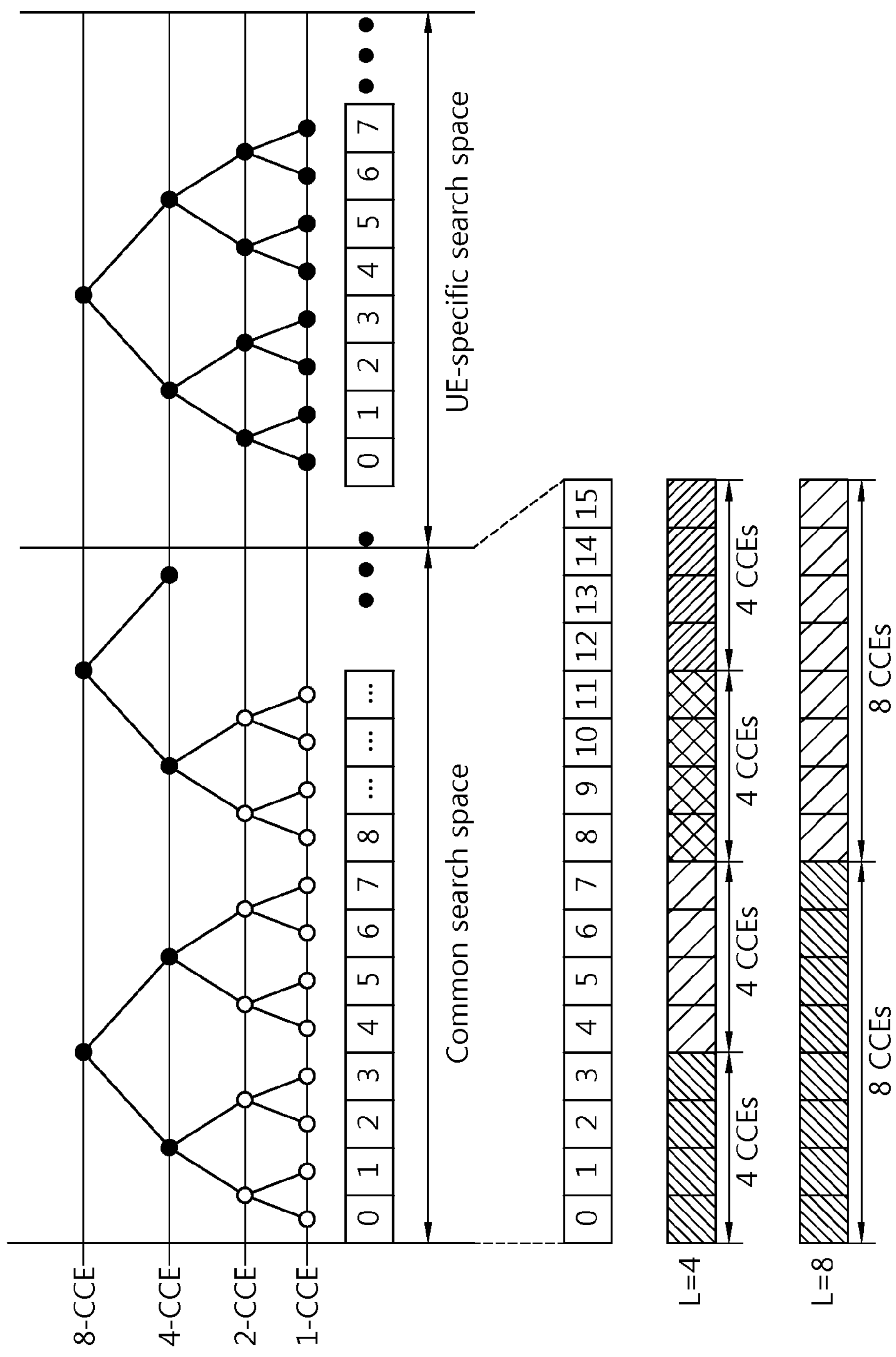
FIG. 6 illustrates monitoring of a PDCCH. The monitoring of a PDCCH can reference Clause 9 of the 3GPP TS 36.213 V10.2.0 (June 2011).

FIG. 6 illustrates monitoring of a PDCCH. The monitoring of a PDCCH can reference Clause 9 of the 3GPP TS 36.213 V10.2.0 (June 2011).

The UE uses blind decoding for detection of a PDCCH. Blind decoding carries out demasking of a CRC of a received PDCCH (which is called a candidate PDCCH) with a particular identifier and checks a CRC error to see whether the corresponding PDCCH is a control channel for the UE. The UE does not know beforehand at which position within a control region its PDCCH data are transmitted from a base station at which CCE aggregation level or in which DCI format.

A plurality of PDCCHs can be transmitted within one subframe. The UE monitors the plurality of PDCCHs for each subframe. At this time, monitoring refers to the UE's attempt to decode the PDCCH according to the PDCCH format.

The 3GPP LTE system uses a search space to reduce the burden from blind decoding. A search space can be regarded as a monitoring set for a CCE to search for a PDCCH. The UE can monitor a PDCCH based on a search space.

A search space is divided into a common search space and a UE-specific search space. A common search space is a space in which a search for a PDCCH having common control information is carried out; the common search space can comprise 16 CCEs with CCE indices ranging from 0 to 15 and support a PDCCH with a CCE aggregation level of 4 or 8. A PDCCH which carries UE-specific information (DCI format 0, 1A) may also be transmitted to the common search space. A UE-specific search space supports a PDCCH having a CCE aggregation level of {1, 2, 4, 8}.

The following Table 1 shows the number of PDCCH candidates that the UE monitors.

TABLE 1

| Search space $S_k^{(L)}$ | | | Number of | |
|---|---|---|---|---|
| Type | Aggregation level L | Size [in CCEs] | PDCCH candidates $M^{(L)}$ | DCI format |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of a search space is determined by Table 1 and the starting position of the search space is defined differently for the common search space and UE-specific search space. The starting position of the common search space is fixed regardless of a subframe, but the starting position of the UE-specific search space can be varied for each subframe, depending on a UE identifier (for example, C-RNTI), CCE aggregation level and/or slot number within a radio frame. In case the starting position of the UE-specific search space is located in the common search space, the UE-specific search space and the common search space can overlap with each other.

At a CCE aggregation level L ∈ {1, 2, 3, 4}, a search space S(L)k is defined as a set of candidate PDCCHs. The CCE corresponding to a candidate PDCCH m of the search space S(L)k is given as follows.

$$L\cdot\{(Y_k-m)\bmod\lfloor N_{CCE,k}/L\rfloor\}+i \quad \text{[Eq. 1]}$$

where i=0, 1, . . . , L−1; m=0, . . . , M(L)−1, $N_{CCE,K}$ represents the total number of CCEs that can be used for transmission of a PDCCH within a control region of a subframe k. The control region includes a set of CCEs indexed from 0 to $N_{CCE,K}$. M(L) represents the number of candidate PDCCHs at the CCE aggregation level L in a given search space.

If the UE is configured with a Carrier Indicator Field (CIF), m'=m+M(L)ncif. ncif represents a value of the CIF. If the UE is not configured with the ICF, m'=m.

In the common search space, Yk is set to 0 at two aggregation levels, L=4 and L=8.

In the UE-specific search space at an aggregation level L, the variable Yk is defined as follows.

$$Y_k=(A\cdot Y_{k-1})\bmod D \quad \text{[Eq. 2]}$$

where Y−1=nRNTI≠ 0, A=39827, D=65537, k=floor(ns/2), and ns represents a slot number within a radio frame.

When the UE monitors a PDCCH on the basis of a C-RNTI, the DCI format and a search space to be monitored are determined according to the transmission mode of the PDSCH. The following table shows an example of PDCCH monitoring for which the C-RNTI is applied.

TABLE 2

| Transmission mode | DCI format | Search space | Transmission mode of PDSCH according to PDCCH |
|---|---|---|---|
| Mode 1 | DCI format 1A | Common and UE-specific | Single antenna port, port 0 |
| | DCI format 1 | UE-specific | Single antenna port, port 0 |
| Mode 2 | DCI format 1A | Common and UE-specific | Transmit diversity |
| | DCI format 1 | UE-specific | Transmit diversity |
| Mode 3 | DCI format 1A | Common and UE-specific | Transmit diversity |
| | DCI format 2A | UE-specific | Cyclic Delay Diversity (CDD) or transmit diversity |
| Mode 4 | DCI format 1A | Common and UE-specific | Transmit diversity |
| | DCI format 2 | UE-specific | Closed-loop spatial multiplexing |
| Mode 5 | DCI format 1A | Common and UE-specific | Transmit diversity |
| | DCI format 1D | UE-specific | Multi-User Multiple Input Multiple Output (MU-MIMO) |
| Mode 6 | DCI format 1A | Common and UE-specific | Transmit diversity |
| | DCI format 1B | UE-specific | Closed-loop spatial multiplexing |
| Mode 7 | DCI format 1A | Common and UE-specific | If the number of PBCH transmission ports is 1, single antenna port, port 0, or transmit diversity |
| | DCI format 1 | UE-specific | Single antenna port, port 5 |
| Mode 8 | DCI format 1A | Common and UE-specific | If the number of PBCH transmission ports is 1, single antenna port, port 0, or transmit diversity |
| | DCI format 2B | UE-specific | Dual layer transmission (port 7 or 8), or single antenna port, port 7 or 8 |

The following table shows various uses of the DCI format.

TABLE 3

| DCI format | Purpose |
|---|---|
| DCI format 0 | Used for PUSCH scheduling |
| DCI format 1 | Used for scheduling of one PDSCH codeword |

TABLE 3-continued

| DCI format | Purpose |
|---|---|
| DCI format 1A | Used for compact scheduling of one PDSCH codeword and a random access process |
| DCI format 1B | Used for compact scheduling of one PDSCH codeword having precoding information |
| DCI format 1C | Used for very compact scheduling of one PDSCH codeword |
| DCI format 1D | Used for compact scheduling of one PDSCH codeword having precoding and power offset information |
| DCI format 2 | Used for PDSCH scheduling of UEs configured for closed-loop spatial multiplexing mode |
| DCI format 2A | Used for PDSCH scheduling of UEs configured for open-loop spatial multiplexing mode |
| DCI format 3 | Used for transmission of a TPC command of PUCCH and PUSCH having two-bit power adjustment |
| DCI format 3A | Used for transmission of a TPC command of PUCCH and PUSCH having one-bit power adjustment |

Specific information of control data included in the afore-mentioned DCI format is disclosed in 5.3.3.1 DCI format of the 3GPP TS 36.212 specification. In the following embodiment of the present invention, information included in the DCI format 0/1/1A is disclosed briefly.

For example, the DCI format 0 includes the following information as shown in Table 4.

TABLE 4

| DCI format | Field | Bit | Field Information |
|---|---|---|---|
| Format 0 | DCIFormat | — | Format 0 |
| | Carrier indicator | 0 or 3 bit | |
| | Flag for format0/1A | 1 bit | Value 0 indicates format 0, value 1 indicates format 1A |
| | FreqHopping | 1 bit | PUSCH frequency hopping flag |
| | Allocation | Variable | Resource block assignment and hopping resource allocation |
| | ModCoding | 5 bits | Modulation, coding scheme and redundancy version |
| | NewData | 1 bit | New data indicator |
| | TPC | 2 bits | TPC command for scheduled PUSCH |
| | CShiftMDRS | 3 bits | Cyclic shift for Demodulation Reference Signal |
| | UL index | | |
| | DAI | 2 bits | Downlink assignment index (DAI, TDD only) |
| | CSI request | 1 or 2 bits | Request channel state information |
| | SRS request | 0 or 1 bit | Request SRS |
| | Resource allocation type | 1 bit | |

For example, DCI format 1 can include the information as shown in the following Table 5.

TABLE 5

| DCI format | Field | Bit | Field information |
|---|---|---|---|
| Format 1 | DCIFormat | — | Format 1 |
| | Carrier indicator | 0 or 3 bit | |
| | Allocation Type | 1 bit | Resource allocation header: type 0, type 1 (only if downlink bandwidth is >10 PRBs) |
| | Allocation | Variable | Resource block assignment/allocation |
| | ModCoding | 5 bits | Modulation and coding scheme |
| | HARQNo | 3 bits (FDD) 4 bits (TDD) | HARQ process number |
| | NewData | 1 bit | New data indicator |
| | RV | 2 bits | Redundancy version |
| | TPC | 2 bits | PUCCH TPC command |
| | DAI | 2 bits | Downlink assignment index (DAI, TDD only) |

For example, DCI format 1A can include the information as shown in the following Table 6.

TABLE 6

| DCI format | Field | Bit | Field information |
|---|---|---|---|
| Format 1A | DCIFormat | — | Format 1A |
| | Carrier indicator | 0 or 3 bit | |
| | Flag for format0/1A | 1 bit | Value 0 indicates format 0, value 1 indicates format 1A |
| | Allocation Type | 1 bit | VRB assignment flag: 0 (localized), 1 (distributed) |
| | Allocation | Variable | Resource block assignment/ allocation |
| | ModCoding | 5 bits | Modulation and coding scheme |
| | HARQNo | 3 bits (FDD) 4 bits (TDD) | HARQ process number |
| | NewData | 1 bit | New data indicator |
| | RV | 2 bits | Redundancy version |
| | TPC | 2 bits | PUCCH TPC command |

TABLE 6-continued

| DCI format | Field | Bit | Field information |
|---|---|---|---|
| | DAI | 2 bits | Downlink assignment index (DAI, TDD only) |
| | SRS request | 0 or 1 bit | |

Figure 7:
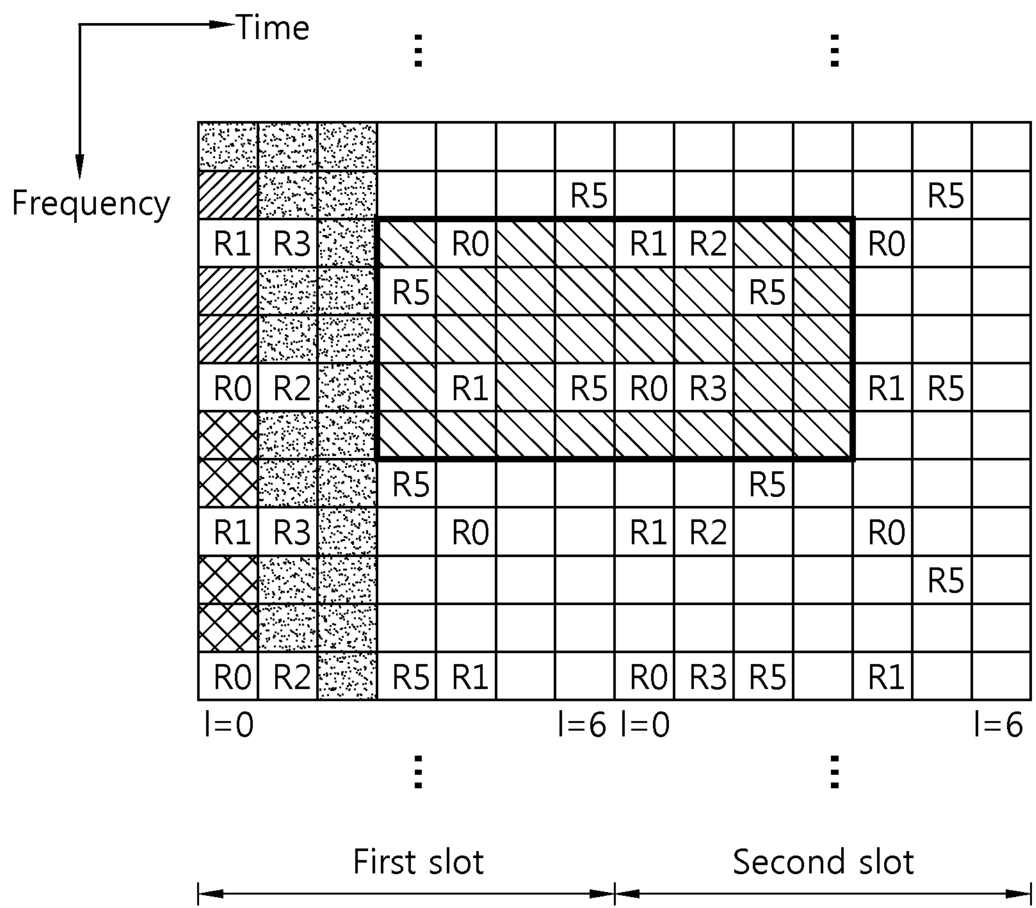
FIG. 7 illustrates an example where a reference signal and a control channel are disposed in a downlink subframe of the 3GPP LTE standard.

FIG. 7 illustrates an example where a reference signal and a control channel are disposed in a downlink subframe of the 3GPP LTE standard.

The control region (or PDCCH region) includes three preceding OFDM symbols, and the data region to which a PDSCH is transmitted includes the remaining OFDM symbols.

In the control region, PCFICH, PHICH and/or PDCCH is transmitted.

A Physical HARQ ACK/NACK Indicator Channel (PHICH) can transmit Hybrid Automatic Retransmission reQuest (HARQ) information in response to uplink transmission.

A Physical Control Format Indicator Channel (PCFICH) can indicate the information about the number of OFDM symbols allocated to the PDCCH. For example, Control Format Indicator (CFI) of the PCFICH can indicate three OFDM symbols. The part of the control region excluding the resources to which the PCFICH and/or PHICH is transmitted is used to form a PDCCH region for the UE to monitor a PDCCH.

Various reference signals can be transmitted to a subframe.

A Cell-specific Reference Signal (CRS), which is a reference signal that all of the UEs within a cell receive, can be transmitted across the whole downlink frequency band. In FIG. 7, 'R0' represents an RE to which a CRS about a first antenna port is transmitted; 'R1' represents an RE to which a CRS about a second antenna port is transmitted; 'R2' represents an RE to which a CRS about a third antenna port is transmitted; and 'R3' represents an RE to which a CRS about a fourth antenna port is transmitted.

An RS sequence $r_{l,ns}(m)$ for the CRS is defined as follows.

$$r_{l,\mathrm{ns}}(m) = \frac{1}{\sqrt{2}}(1 - 2\cdot c(2m)) + j\frac{1}{\sqrt{2}}(1 - 2\cdot c(2m+1)) \quad \langle \text{Eq. 3} \rangle$$

where m=0, 1, . . . , $2N_{RB}^{max,DL}-1$, $N_{RB}^{max,DL}$ is the maximum number of RBs; ns is the slot number within a radio frame; and 1 is the OFDM symbol number within the slot.

A pseudo-random sequence c(i) is defined by a Gold sequence of length 31 as shown below.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \langle \text{Eq. 4} \rangle$$

where Nc=1600 and a first m-sequence is initialized as follows: x1(0)=1, x1(n)=0, m=1, 2, . . . , 30.

A second m-sequence is initialized at the start position of each OFDM symbol so that $c_{init}=2^{10}\cdot(7\cdot(n_s+1)+l+1)\cdot(2\cdot N_{ID}^{cell}+1)+2\cdot N_{ID}^{cell}-N_{CP}$. $N_{ID}^{cell}$ is a Physical Cell Identity (PCI), and in a normal CP, $N_{CP}=1$ while $N_{CP}=0$ in the case of an extended CP.

Also, a UE-specific Reference Signal (URS) can be transmitted to a subframe. Although a CRS is transmitted across the whole region of a subframe, a URS is transmitted within a data region of the subframe and used for demodulation of the corresponding PDSCH. In the figure, 'R5' represents an RE to which a URS is transmitted. The DM-RS is a reference signal used for demodulation of EPDCCH data.

A URS can be transmitted from an RB to which the corresponding PDSCH data are resource-mapped. In FIG. 7, R5 is also indicated outside the region to which the PDSCH is transmitted, which is intended only to indicate the position of the RE to which the URS is mapped.

The URS is used only by the UE which receives the corresponding PDSCH. The RS sequence $r_{l,n_s}(m)$ for a URS is the same as Eq. 3. At this time, m=0, 1, . . . , $12N_{RB}^{PDSCH}-1$ and NPDSCH, RB represents the number of RBs involved in the corresponding PDSCH transmission. A pseudo random sequence generator is initialized at the starting position of each subframe so that $c_{init}=(\lfloor n_s/2\rfloor+1)\cdot(2N_{ID}^{cell}+1)\cdot 2^{16}+n_{RNTI}$. nRNTI is an identifier of a wireless device.

The above description is related to the case where a URS is transmitted through a single antenna. When the URS is transmitted through multiple antennas, the pseudo random sequence generator is initialized at the starting position of each subframe so that $c_{init}=(\lfloor n_s/2\rfloor+1)\cdot(2n_{ID}^{(nSCID)}+1)\cdot 2^{16}+n_{SCID}$. $n_{SCID}$ is a parameter obtained from a DL grant (for example, DCI format 2B or 2C) related to PDSCH transmission.

A URS supports Multiple Input Multiple Output (MIMO) transmission. An RS sequence for a URS can be spread as shown in the following spread sequence according to an antenna port or a layer.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer can be defined as an information path input to a precoder. A rank is a non-zero eigenvalue of a MIMO channel matrix and is the same as the number of layers or spatial streams. A layer can be made to correspond to an antenna port recognizing a URS and/or a spread sequence applied to the URS.

Meanwhile, a PDCCH is monitored within a limited region denoted as a control region within a subframe, and a CRS transmitted across the whole frequency band is used for demodulation of the PDCCH. As types of control data are diversified and the amount of the control data is increased, scheduling flexibility based on the existing PDCCH becomes degraded. Also, to reduce the overhead due to transmission of a CRS, Enhanced PDCCH (EPDCCH) is being introduced.

Figure 8:
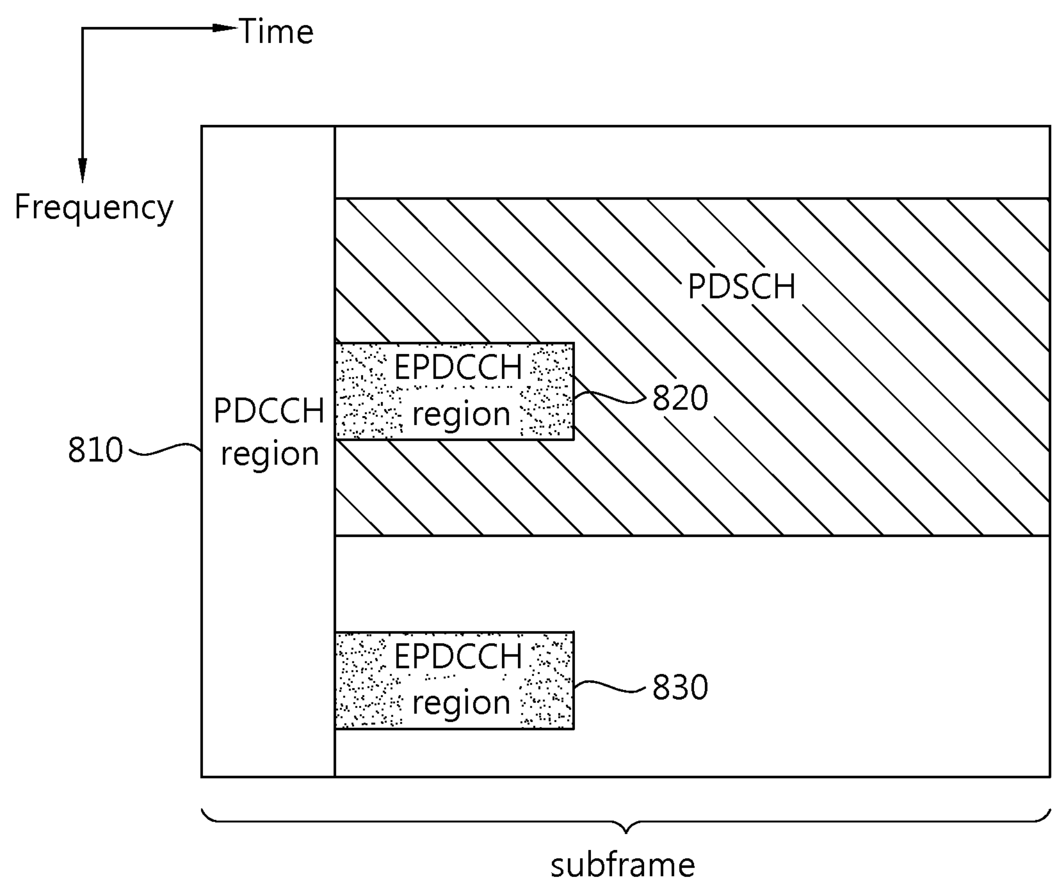
FIG. 8 is one example of a subframe including EPDCCH data.

FIG. 8 is one example of a subframe including EPDCCH data.

A subframe may include zero or one PDCCH region 810 or more than one EPDCCH region 820, 830.

The EPDCCH region 820, 830 is the region in which the UE monitors the EPDCCH. A PDCCH region 810 is located within a maximum of four preceding OFDM symbols of the subframe whereas the EPDCCH region 820, 830 can be scheduled in a flexible manner in an OFDM symbol following the PDCCH region 810.

One or more EPDCCH regions 820, 830 can be designated to the UE, and the UE can monitor EPDCCH data in the designated EPDCCH regions 820, 830.

The base station can inform the UE about the number of EPDCCH regions 820, 830, location and size thereof and/or information about a subframe to monitor the EPDCCH.

In the PDCCH region 810, a PDCCH can be demodulated on the basis of a CRS. In the EPDCCH region 820, 830, a DM-RS rather than the CRS may be defined for demodulation of the EPDCCH. The DM-RS can be transmitted in the corresponding EPDCCH region 820, 830.

An RS sequence for the DM-RS is the same as shown in Eq. 3. At this time, $m=0, 1, \ldots, 12N_{RB}^{max,DL}-1$ and $N_{RB}^{max,DL}$ is the maximum number of RBs. A pseudo random sequence generator is initialized at the start position of each subframe so that $c_{init}=(\lfloor n_s/2 \rfloor+1)\cdot(2n_{ID,i}^{EPDCCH}+1)\cdot 2^{16}+n_{SCID}^{EPDCCH}$. $n_s$ is a slot number within a radio frame; $n_{ID,i}^{EPDCCH}$ is a cell index related to the corresponding EPDCCH region; $n_{SCID}^{EPDCCH}$ is a parameter provided through a upper layer signaling.

Each EPDCCH region 820, 830 can be used for scheduling of disparate cells. For example, the EPDCCH within the EPDCCH region 820 may carry scheduling information for a first cell while the EPDCCH within the EPDCCH region 830 carries scheduling information for a second cell.

When an EPDCCH is transmitted through multiple antennas in the EPDCCH region 820, 830, the same precoding as in the case of the EPDCCH can be applied to the DM-RS within the EPDCCH region 820, 830.

Compared to the fact that a PDCCH uses CCEs as transmission resource units, a transmission resource unit for the EPDCCH is called an Enhanced Control Channel Element (ECCE). An aggregation level can be defined by resource units with which an EPDCCH is monitored. For example, given that one ECCE is a minimum resource for the EPDCCH, the aggregation level L can be defined as $L=\{1, 2, 4, 8, 16\}$.

In what follows, a search space can correspond to the EPDCCH region. In the search space, one or more EPDCCH candidates can be monitored at the aggregation level of one or more.

Figure 9:
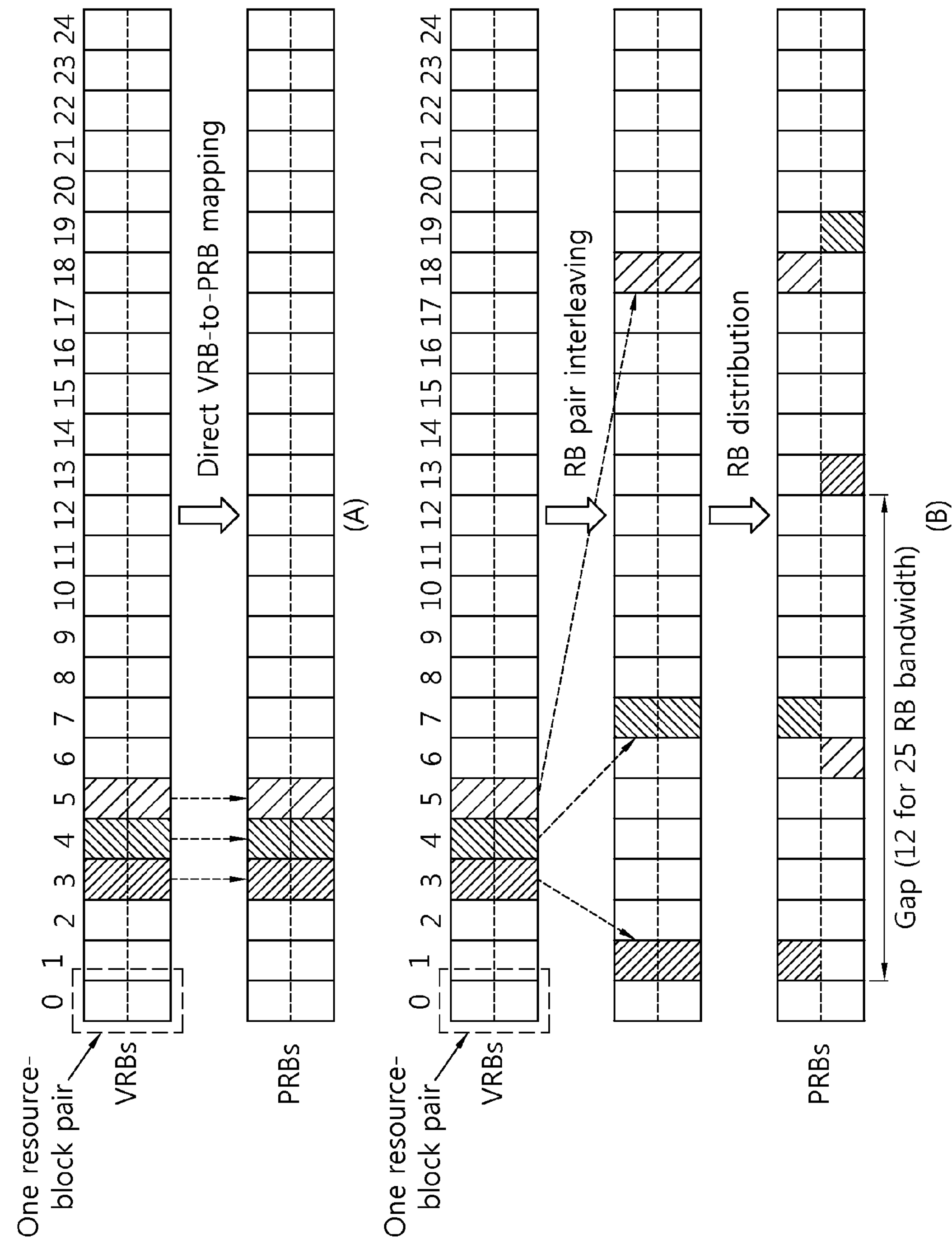
FIG. 9 illustrates a method for carrying out VRB-PRB mapping based on LVRB and DVRB.

FIG. 9 illustrates a method for carrying out VRB-PRB mapping based on LVRB and DVRB.

FIG. 9(A) illustrates the case where VRB is LVRB. In case VRB is LVRB, VRB can be mapped directly to the position of PRB. In other words, the VRB of a localized type can be mapped to the PRB at the same position.

FIG. 9(B) illustrates the case where VRB is DVRB. In case VRB is DVRB, VRB can be mapped to PRB through RB pair interleaving and RB distribution. In this case, consecutive VRBs may not be mapped to consecutive PRBs on the frequency axis. VRBs of a distribution type can be mapped to the PRBs at the positions distributed across the frequency axis on the basis of system bandwidth.

The next-generation LTE-A system considers to support low-cost, low specification terminals but specialized for data communication such as reading a meter, measuring water level, utilizing a security camera, and stock report of a vending machine. Such kind of a terminal is called a Machine Type Communication (MTC) terminal. The operating environment of an MTC terminal assumes such a data communication environment where the amount of data to be transmitted and received is small and uplink or downlink data transmission or reception is performed at a low rate. MTC terminal operating in such a data communication environment characterized by the low data transmission rate and infrequent data communication can be implemented with a low manufacturing cost and to consume low power.

Various factors may be taken into account to lower the manufacturing cost of MTC terminals. For example, MTC terminals can be made to use a frequency band narrower than 20 MHz, or the number of Physical Resource Blocks (PRBs) used by an MTC terminal is limited, or data rate of an MTC terminal can be made to have a low peak data rate by limiting the Transport Block Size (TBS). Also, MTC terminals can be made to operate in a half-duplex FDD mode or in a single RX/RF chain.

Figure 10:
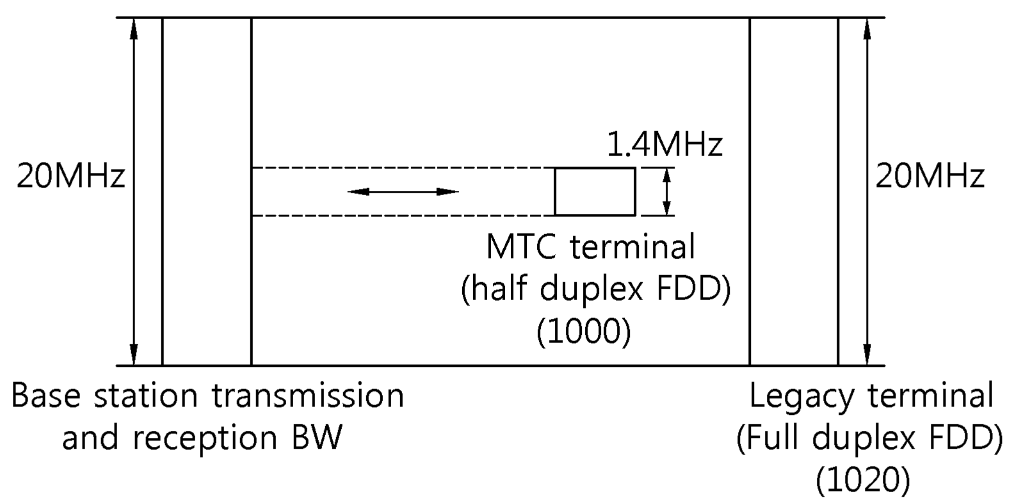
FIG. 10 illustrates frequency bandwidth employed by an MTC terminal.

FIG. 10 illustrates frequency bandwidth employed by an MTC terminal.

In the case of a legacy terminal 1020, bandwidth of 1/4/3/5/10/15/20 MHz has been used by default. Since the bandwidth supported by a base station may vary depending on regions or service providers, a plurality of bandwidth as shown above have been supported. For example, in case a legacy terminal 1020 supports 20 MHz bandwidth and 2×2 MIMO, data can be received at a maximum of 150 Mbps. The larger the bandwidth to be supported, the more complex the terminal and the larger the power consumption. Therefore, such kind of a structure is not suitable for a terminal requiring a small data rate and low power consumption, such as the MTC terminal 1000. Suppose the data rate of the MTC terminal 1000 is 118.4 kbps for downlink transmission and 59.2 kbps for uplink transmission. Then if the frequency bandwidth to be supported by the MTC terminal 1000 is 1.4 MHz, the aforementioned downlink and uplink data rate can be accommodated. In case the MTC terminal 1000 uses bandwidth of 1.4 MHz, the power consumed by an RF and a base band may become smaller than legacy terminals.

Also, to reduce the size and price of the MTC terminal 1000, a half-duplex FDD method may be used, where downlink and uplink transmission are duplexed in the FDD mode but are not performed at the same time. In case the half-duplex FDD method is used in a duplexing mode, complexity of the RF part of the MTC terminal 100 and an overall cost of the MTC terminal may be reduced.

A new category (for example, low-end UE category) can be defined for the MTC terminal 1000. The new category for the MTC terminal 1000 can be specified by taking into account the factors to reduce a manufacturing cost of the MTC terminal 1000 in addition to the category 1 which is a category for terminals with the lowest specification. In a particular data communication system such as the LTE system, efficiency of frequency utilization and system operation can be improved by employing the MTC terminal 1000. There needs to optimize the MTC terminal 1000 meant for the LTE system based on the considerations.

(1) Fragmented Resource Block

The packet size used for an MTC terminal to transmit and receive data may be smaller than the size of packets used for legacy terminal to transmit and receive data in the existing LTE systems. For example, the size of packets for an MTC terminal to transmit and receive data may amount to about 100 bytes. In other words, a base station performing downlink transmission toward an MTC terminal may transmit control and traffic data to the MTC terminal through packets of small size.

As described above, suppose the frequency bandwidth supported by the MTC terminal is small and a single RX/RF chain cost reduction technique is employed. In this case, frequency diversity and spatial diversity may not be easily applied to the MTC terminal. For example, since frequency diversity is not available for the case where downlink control data and traffic data are scheduled through a small number of PRBs, transmission coverage of downlink transmission may be reduced.

In this reason, there needs a method for the MTC terminal to maximize frequency diversity within an operating frequency band. The smallest unit for a base station to perform downlink scheduling is PRB; therefore, it needs to schedule downlink data so that downlink data can be transmitted to the MTC terminal across the whole operating frequency band. This method can be performed through a distributed resource block mapping method such as the aforementioned DVRB. However, it should be noted that the amount of data to be transmitted or received to the MTC terminal is small. Therefore, in many cases, one PRB may be large enough to schedule control and traffic data of the MTC terminal. Thus, it is necessary for the MTC terminal to schedule transmission and reception data in a distributed manner on the basis of another resource allocation method rather than a distributed resource allocation method such as the existing DVRB. In what follows, in the embodiment of the present invention, disclosed will be a resource allocation method for data transmitted from a base station to an MTC terminal.

According to an embodiment of the present invention, a method for dividing a PRB into a plurality of small resources may be used to distribute data transmitted to an MTC terminal. In what follows, in the embodiment of the present invention, resource divided from one PRB is called a fragmented Physical Resource Block (PRB) or partitioned PRB. Alternatively a PRB may be called a resource allocation unit and a partitioned PRB may be called a sub-resource allocation unit.

Downlink data transmission based on frequency diversity can be carried out even in the case where the MTC terminal supports a narrow operating frequency band and holds a small amount of data by scheduling downlink data transmitted from the base station to the MTC terminal through a plurality of fragmented PRBs. Various methods can be used to generate a plurality of fragmented PRBs on the basis of one PRB. In what follows, in the embodiment of the present invention, disclosed is a method for dividing one PRB into a plurality of fragmented PRBs on the basis of time.

Time Division Multiplexing (TDM) Method

As one method for dividing a PRB into a plurality of fragmented PRBs, one PRB can be divided into a plurality of fragmented PRBs on the basis of time.

For example, based on an OFDM symbol, one PRB pair can be divided into a plurality of fragmented PRBs.

Figure 11:
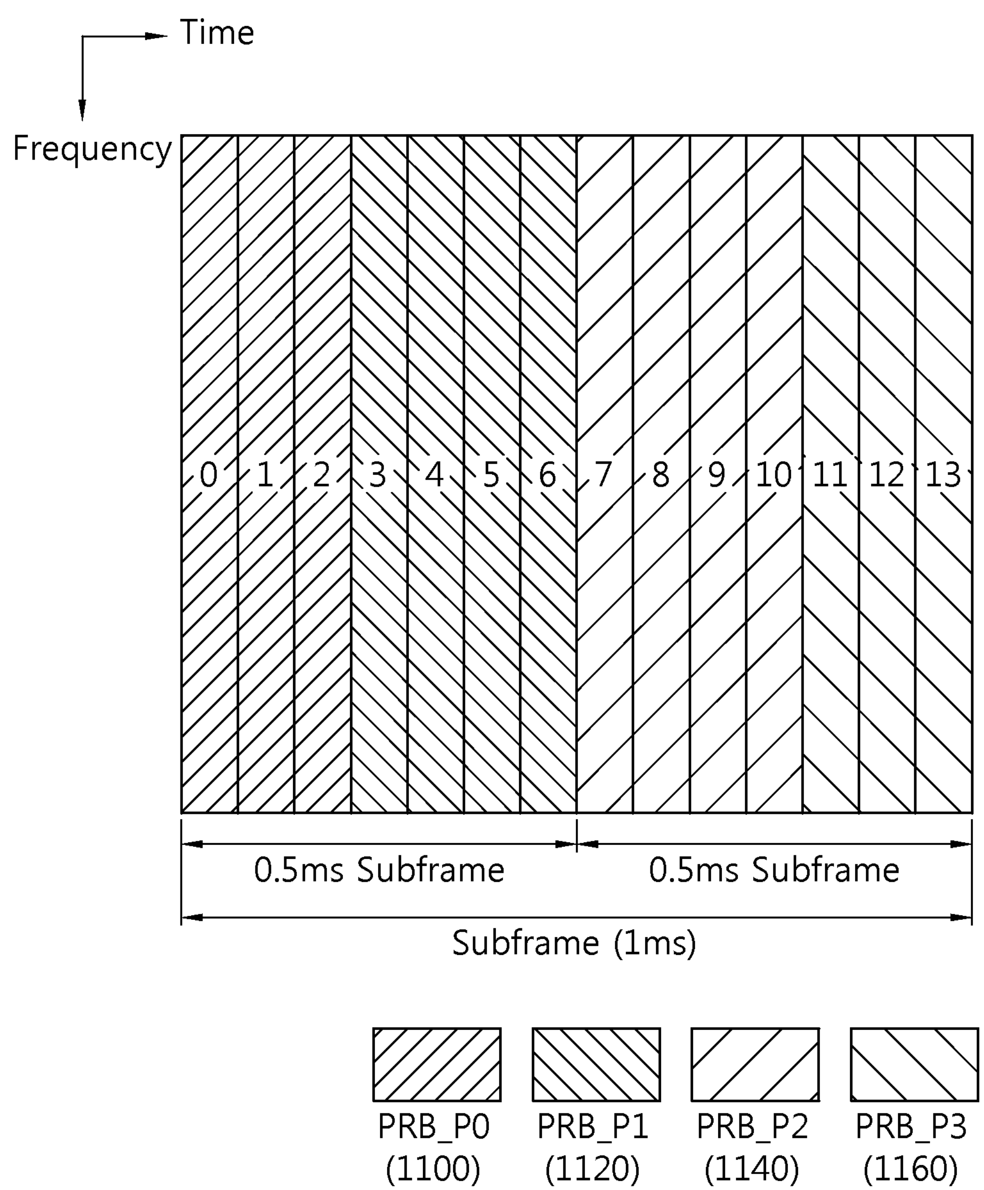
FIG. 11 illustrates a method for partitioning a PRB on the basis of time according to an embodiment of the present invention.

FIG. 11 illustrates a method for partitioning a PRB on the basis of time according to an embodiment of the present invention.

FIG. 11 illustrates the case where one PRB pair is divided into four fragmented PRBs.

Suppose OFDM symbols forming a PRB pair are indexed sequentially from 0 to 13. Then each OFDM symbol can be represented by 0 OFDM symbol to 13 OFDM symbol. OFDM symbols allocated to a first fragmented PRB 1100 to a fourth fragmented PRB 1160 may correspond to a first fragmented PRB (0 to 2 OFDM symbol, 1100), a second fragmented PRB (3 to 6 OFDM symbol, 1120), a third fragmented PRB (7 to 10 OFDM symbol, 1140), and a fourth fragmented PRB (11 to 13 OFDM symbol, 1160).

The PRB fragmentation method disclosed in FIG. 11 illustrates a method for determining fragmented PRBs on the basis of time. A PRB pair can be divided into a plurality of fragmented PRBs on the basis of the number of other OFDM symbols rather than the number of OFDM symbols disclosed in FIG. 11, which also belongs to the technical scope of the present invention.

In other words, a base station modifies a method for dividing a PRB in various ways so that the number of OFDM symbols allocated to fragmented PRBs and/or the first OFDM symbol index to the last OFDM symbol index of fragmented PRBs can be changed. An MTC terminal can obtain information (for example, the first OFDM symbol index to the last OFDM symbol index of fragmented PRBs) about fragmented PRBs allocated through upper layer signaling such as RRC signaling.

The information about fragmented PRBs that the MTC terminal receives from the base station can have various information formats. For example, the MTC terminal can receive from the base station information about the first and the last OFDM symbol with respect to the resources to which downlink data are transmitted. In other words, the MTC terminal can demodulate downlink data transmitted from the corresponding resources based on the index information of the first and the last OFDM symbol transmitted. For example, a particular MTC terminal can receive OFDM symbol 3 and 6 as the information about fragmented PRBs. In this case, the MTC terminal can demodulate downlink data transmitted through a second fragmented PRB. The method for transmitting information about fragmented PRBs is only an example. Also, information about fragmented PRBs allocated to each MTC terminal can be transmitted in the form of bitmap.

Another method for transmitting information about fragmented PRBs transmits to the MTC terminal information about the first OFDM symbol index of fragmented PRBs and the number of OFDM symbols allocated to fragmented PRBs. For example, the base station can transmit to the MTC terminal the OFDM symbol 3, which is the first location of the fragmented PRB, and the number of allocated OFDM symbols, 4, as the information about fragmented PRBs. The MTC terminal can demodulate the data transmitted through the second fragmented PRB 1120 corresponding to the OFDM symbol 3 to 6 on the basis of the OFDM symbol 3 and the number of allocated OFDM symbols, 4.

The parameters for determining the initial values of a pseudo random sequence to generate a reference signal used by each fragmented PRB (for example, $n_{ID,i}^{EPDCCH}$, $n_{SCID}^{EPDCCH}$) can have different values from each other for the respective fragmented PRBs. In other words, even if the reference signal is included in one PRB, the reference signal can be generated based on separate pseudo random sequences for the respective fragmented PRBs.

The fragmented PRBs can each include a URS generated on the basis of the respective Cell-Radio Network Temporary Identities (C-RNTIs). Each MTC terminal can demodulate downlink data information transmitted through a PRB allocated to the MTC terminal on the basis of individual identifier information.

According to another embodiment of the present invention, instead of transmitting information about fragmented PRBs separately, frequency diversity can be implemented by carrying out DVRB by using the fragmented PRBs as one resource unit. In other words, resource allocation can be distributed by changing the PRBs which function as a criterion to carry out the existing DVRB into fragmented PRBs of small size.

Also, according to an embodiment of the present invention, the initial value of a pseudo random sequence for determining a DM-RS sequence of each fragmented PRB can be determined by $c_{init}=(\lfloor n_s/2 \rfloor+1)\cdot(2n_{ID,i}^{EPDCCH}+1)\cdot 2^{16}+n_{SCID}^{EPDCCH}+k$. This is an illustrative equation, and the additional parameter k may be related to the corresponding fragmented PRB. On the basis of k, disparate DM-RS sequences corresponding to the respective fragmented PRBs can be determined. The aforementioned equation is one illustrative equation for determining disparate reference sequences for the respective fragmented PRBs. In other words, a different equation rather than the aforementioned one may be used to determine different reference signal sequences with respect to the fragmented PRBs, which also belongs to the technical scope of the present invention.

FIG. 11 discloses a method for determining a plurality of fragmented PRBs on the basis of time; however, the PRBs can be divided into a plurality of fragmented PRBs on the basis of both of time and frequency rather than time only, which also belongs to the technical scope of the present invention.

According to another embodiment of the present, in case the MTC terminal receives resources by using fragmented PRBs, a reference signal can be newly established. For example, suppose a reference signal is transmitted through two consecutive OFDM symbols. In case a reference signal transmitted through two consecutive OFDM symbols belongs to different fragmented PRBs due to the boundaries of the fragmented PRBs, demodulation performance of downlink data transmitted through the respective fragmented PRBs may be degraded.

In what follows, in the embodiment of the present invention, a DM-RS is disclosed as an example of such a reference signal. In what follows, in the embodiment of the present invention, though a DM-RS newly established with respect to fragmented PRBs is disclosed, a reference signal can be newly established in the same manner with respect to a different reference signal (for example, URS).

As one method for configuring a DM-RS pattern, a DM-RS can be applied to the first and the second OFDM symbol allocated to fragmented PRBs.

Figure 12:
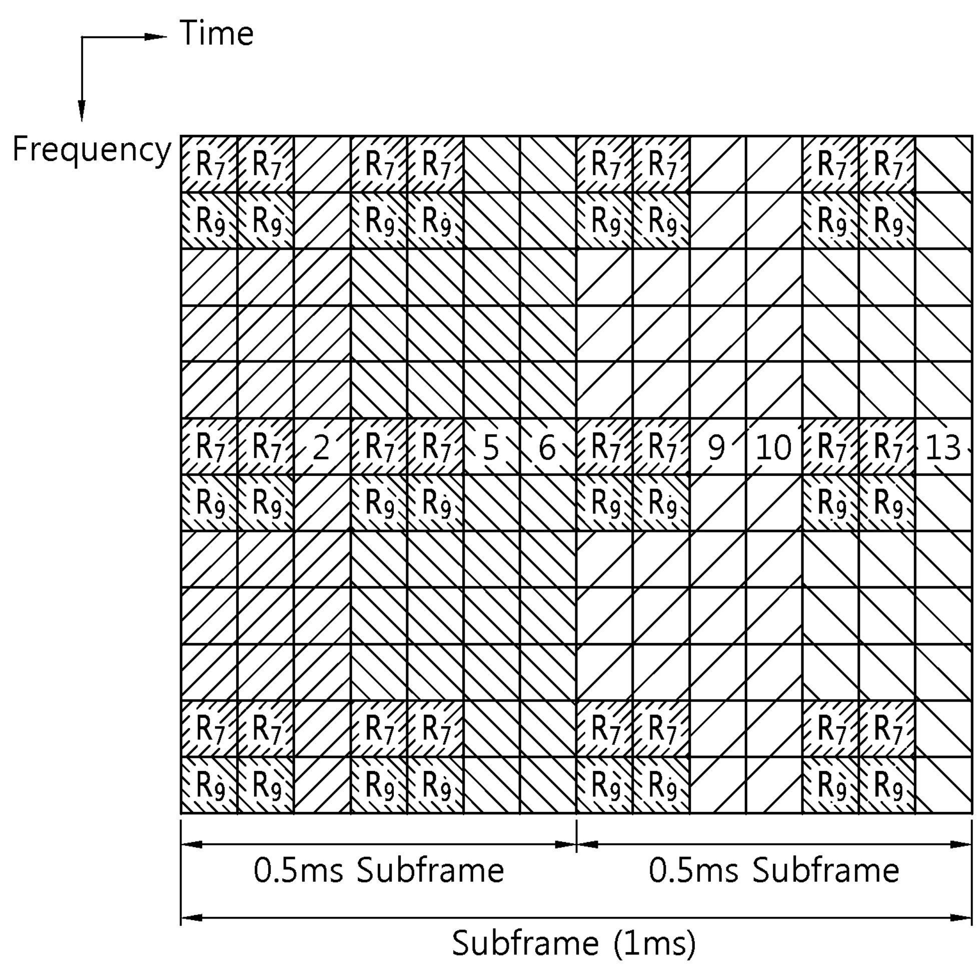
FIG. 12 illustrates a method for setting a DM-RS in a fragmented PRB according to an embodiment of the present invention.
Figure 12:
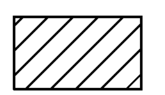

FIG. 12 illustrates a method for setting a DM-RS in a fragmented PRB according to an embodiment of the present invention.

FIG. 12 assumes four fragmented PRBs disclosed in FIG. 11.

With reference to FIG. 12, a DM-RS can be set to the first OFDM symbol and the second OFDM symbol of the first fragmented PRB 1200. This method can set a DM-RS to the first and the second OFDM symbol in the same manner for the second fragmented PRB 1220 to the fourth fragmented PRB 1260. In other words, if the number of OFDM symbols allocated to the respective fragmented PRBs is two or more, the DM-RS can be set to the first and the second OFDM symbol of each fragmented PRB. Each fragmented PRB can perform demodulation on the basis of the DM-RS located at the first and the second OFDM symbol. For example, the MTC terminal can carry out demodulation of EPDCCH data on the basis of the DM-RS included in the fragmented PRB. In case the reference signal is a URS, demodulation of the PDSCH can be carried out based on the URS located at the first and the second OFDM symbol of each fragmented PRB.

Another method may be used to set a DM-RS for a fragmented PRB. For example, the DM-RS may be set only for part of the fragmented PRBs.

In the TDD mode, a DM-RS pattern of a special subframe can be used as the DM-RS pattern of a fragmented PRB.

Figure 13:
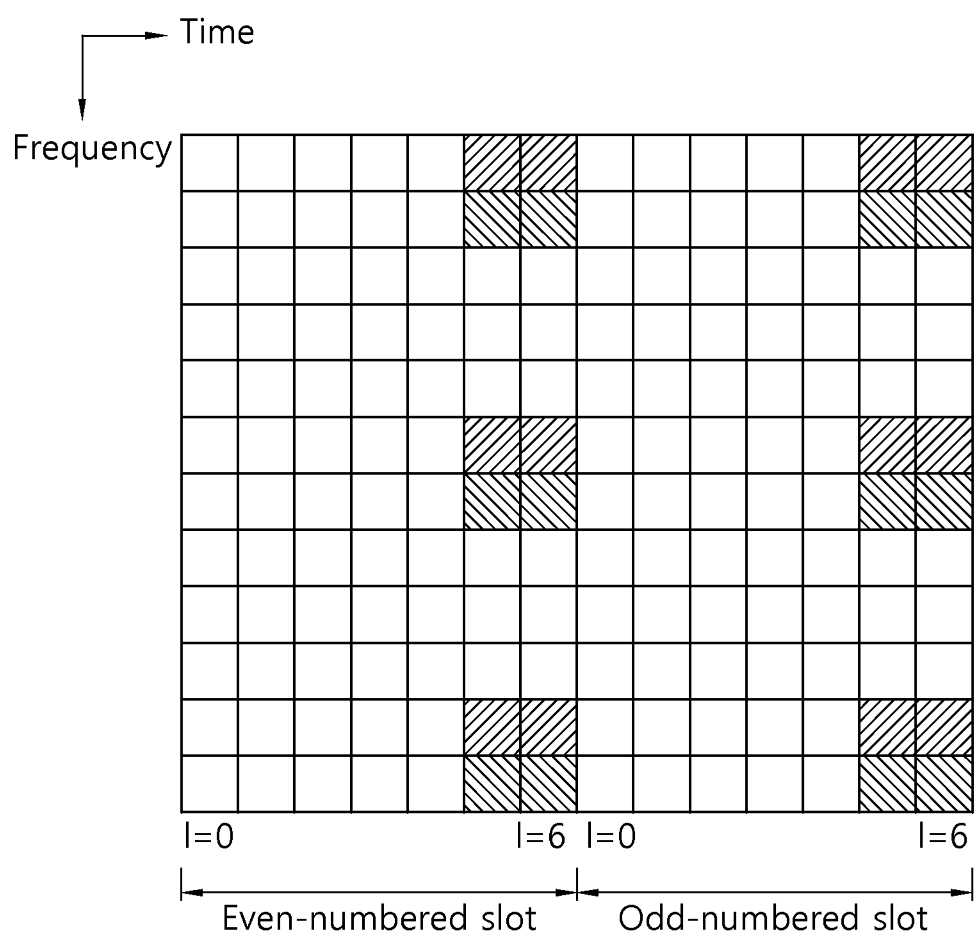
FIG. 13 illustrates a method for setting a DM-RS in a fragmented PRB according to an embodiment of the present invention.

FIG. 13 illustrates a method for setting a DM-RS in a fragmented PRB according to an embodiment of the present invention.

DM-RS setting disclosed in FIG. 13 can be applied to the case where the number of OFDM symbols allocated to fragmented PRBs is 3 or 4.

With reference to FIG. 13, a DM-RS can be set to the OFDM symbol 5 and 6. In case two fragmented PRBs are set to one slot, a first fragmented PRB can be allocated to three OFDM symbols, and a second fragmented PRB can be allocated to four OFDM symbols. In this case, the second fragmented PRB can demodulate EPDCCH data on the basis of the DM-RS set to the OFDM symbol 5 and 6.

In case the number of OFDM symbols used as fragmented PRBs is 6 or more and less than 9 and a normal CP is used, a different DM-RS setting with respect to the fragmented PRBs can be used.

Figure 14:
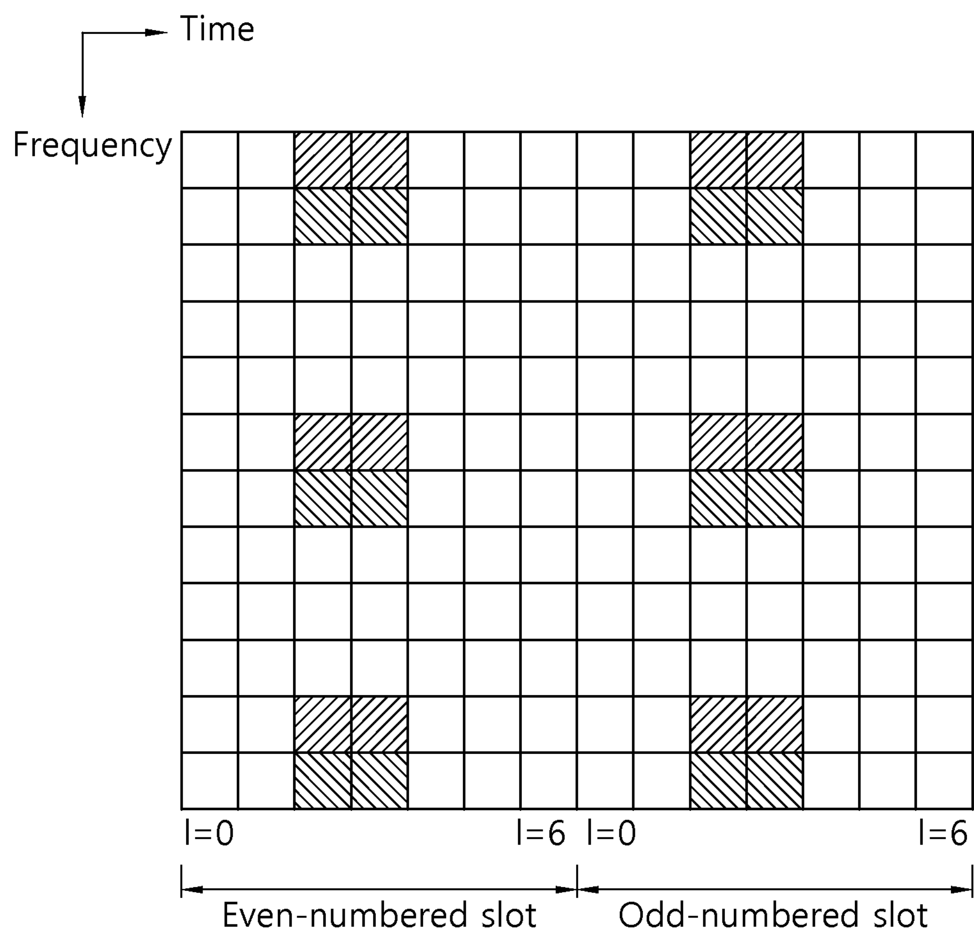
FIG. 14 illustrates a method for setting a DM-RS in a fragmented PRB according to an embodiment of the present invention.

FIG. 14 illustrates a method for setting a DM-RS in a fragmented PRB according to an embodiment of the present invention.

DM-RS setting disclosed in FIG. 14 can be applied to the case where the number of OFDM symbols allocated to fragmented PRBs is 6 or more and less than 9.

A DM-RS can be allocated to the positions of the OFDM symbol 2 and 3 for each slot. In case the number of OFDM symbols allocated to the fragmented PRBs is 6 or more and less than 9, a first fragmented PRB located at a first slot can carry out demodulation on the basis of a DM-RS located at the first slot, and a second fragmented PRB can carry out demodulation on the basis of the DM-RS located at the second slot.

In case the DCI format is used to transmit control data to an MTC terminal, part of the control data included in the DCI format can be modified and added thereto. For example, an MTC terminal switches to a fallback mode at a particular subframe to receive control data.

Suppose DCI format 0/DCI format 1A is supported as the DCI format for transmitting control data to an MTC terminal. The control data of the DCI format 1A can be transmitted to the MTC terminal through an antenna port 0. The antenna port 0 can be used to transmit PBCH data to the MTC terminal.

The MTC terminal does not transmit or receive a large amount of data. Therefore, instead of setting LVRBs or DVRBs dynamically by using a resource allocation method based on the DCI format, a method for allocating resources for downlink data transmitted to the MTC terminal through upper layer signaling can be employed. In case resource allocation for downlink data transmitted to the MTC terminal through upper layer signaling is determined, the LVRB/DVRB field, which indicates whether an LVRB or a DVRB has been used as a method for allocating resources included in the DCI format, does not have to be included in the DCI format to be transmitted.

One should consider various factors to determine a method for allocating resources for downlink data to be transmitted to the MTC terminal. For example, to determine the method for allocating resources for downlink data, one should consider (1) a traffic pattern of each control channel, synchronization signal, and so on; (2) mobility of the MTC terminal; (3) operating frequency band; and (4) system bandwidth.

For example, suppose the MTC terminal is not moving and bursty data are transmitted to the MTC terminal by using a downlink frequency band of 3 MHz. In this case, downlink data can be transmitted by using LVRBs as a resource allocation method. As another example, if the MTC terminal is moving, the downlink data can be transmitted to the MTC terminal by using DVRBs as a resource allocation method. In other words, in the embodiment of the present invention, an upper layer rather than the LVRB/DVRB field included in the DCI format can determine whether to use LVRB or DVRB as a resource allocation method by taking into account various factors such as the condition of the MTC terminal and channel environment.

In case the LVRB is determined as a resource allocation method for the data transmitted to the MTC terminal, a multi-clustered resource allocation method may be additionally used as a method for transmitting data through a downlink to the MTC terminal.

Multi-cluster resource allocation is used as a uplink data allocation method. After precoded data symbols are divided into a plurality of sub-blocks, clustered resources are mapped thereto in the frequency domain to be transmitted. The number of multi-clusters may be predetermined, determined through RRC signaling, dynamically allocated, or set to have a fixed value according to system bandwidth.

The number of bits used for multi-cluster resource allocation can be different from the number of bits used for LVRB. For example, in case a multi-cluster resource allocation method is used for downlink data transmission, the number of bits used for resource allocation (the number of bits for multi-cluster resource allocation) may be one bit larger than the number of bits used for resource allocation when LVRB is employed as a resource allocation method (the number of bits for LVRB resource allocation). In this case, according to the embodiment of the present invention, those bits allocated to the LVRB/DVRB field not used in the DCI format can be used for multi-cluster resource allocation as described above. In addition, zero-padding bits can include a resource allocation type field meant for informing the MTC terminal about whether multi-cluster resource allocation has been used or LVRB resource allocation has been used. The resource allocation type field may consist of 1 bit. For example, in the case of multiple zero-padding bits, a first zero-padding bit can be used as the bit including the information about resource allocation type.

As another method, the information about resource allocation type indicating whether LVRB or multi-cluster resource allocation has been used may be transmitted through upper layer signaling rather than the DCI format.

As another example, the number of bits for multi-cluster resource allocation may have a smaller value than the number of bits for LVRB resource allocation. In this case, the remaining bits after the multi-cluster resource allocation bits are used may be allocated for transmitting information about resource allocation type.

A large number of MTC terminals can be found within one cell. Therefore, MTC terminal can be implemented to support Multiple User-Multiple Input Multiple Output (MU-MIMO) so that a plurality of MTC terminal can receive a service. In this case, those bits assigned to the LVRB/DVRB field not used by the MTC terminal can be re-assigned to be used as the bits for supporting MU-MIMO. For example, those bits assigned to the LVRB/DVRB field can be used for indicating the index of a precoding matrix. Since the LVRB/DVRB field occupies one bit, the information about two precoding matrix indices can be transmitted through the bit employed for the LVRB/DVRB field.

For example, the information about two precoding matrices selected on the basis of the LVRB/DVRB field can be provided through upper layer signaling. In other words, through the upper layer signaling, two precoding matrices can be selected first of all. In addition, information about one of the two precoding matrices selected from upper layer signaling can be transmitted through the one bit allocated to the LVRB/DVRB field. In other words, the MTC terminal can obtain information about a precoding matrix based on the upper layer signaling and the bit allocated to the LVRB/DVRB field.

According to the embodiment of the present invention, only a few particular DCI formats can be used for transmission of control information to the MTC terminal. For example, the MTC terminal can employ the DCI format 0 for uplink resource scheduling and the DCI format 1A for downlink resource scheduling. The sizes of the DCI format 0 and 1A transmitted to the MTC terminal can be changed without increasing the cost for blind detection of the MTC terminal. The existing DCI format 0 and 1A are of the same size and thus the two DCI formats can be distinguished from each other on the basis of flags intended for identifying each of the DCI format 0 and 1A.

However, in case the sizes of the DCI format 0 and 1A transmitted to the MTC terminal are different from each other, the field meant for identifying the DCI format 0 and 1A included therein respectively may not be needed. In other words, the field meant for identifying the DCI format 0/1A can be used for delivering different information.

As one method of using the DCI format 0/1A identification field for a different purpose, the DCI format 0/1A identification field can be used as the aforementioned resource allocation type field. The resource allocation type field can transmit information about whether to use the LVRB or multi-cluster resource allocation through the bit allocated to the DCI formation 0/1A identification field.

Also, according to the embodiment of the present invention, the remaining two bits obtained by not using the LVRB/DVRB field and the DCI format 0/1A identification field in the DCI format transmitted to the MTC terminal can all be used as index information for identifying a precoding matrix. The two bits can be used as an index of four precoding matrices. The DCI 1A format with respect to the MTC terminal can include the following information.

(1) Resource allocation information such as the DCI 1C format (2) Modulation and Coding Scheme (MCS), 5 bits (3) Hybrid Automatic Repeat Request (HARQ), 3 bits (4) New Data Indicator (NDI)

(5) Redundancy Version (RV)

(6) Transmit Power Control (TPC), 2 bits

In this case, the DCI 1C format can be used instead of the DCI 1A format for the MTC terminal.

Also, in case the DCI format 1A is used for a PDCCH order, additional bits can be added to the MTC terminal as shown below.

SRS request: if the SRS request is set to 1, a non-periodic SRS is triggered.

CSI request: if the CSI request is set to 1, a non-periodic CSI reporting is carried out.

The two bits can be positioned after a PRACH mask index (4 bits). In other words, the DCI format of the MTC terminal according to the embodiment of the present invention can include all of the PDCCH order, the SRS request, and the CSI request, making a request at the same time. In most cases, the MTC terminal stays in a stationary state and is synchronized with uplink transmission. By transmitting the DCI format while including all of the PDCCH order, the SRS request, and the CSI request, information about downlink and uplink channel conditions can be quickly obtained.

As another method, only one bit can be added to the DCI format as a request bit. In the case of the TDD mode, the request bit is used as the SRS request while, in the case of the FDD mode, it is used as the CSI request.

In the LTE release 10 specifications, Radio Resource Management (RRM) measurement can be performed in a limited manner. The restricted RRM measurement is performed for a predetermined, particular subframe rather than all of subframes. The data that the MTC terminal transmits and receives are transmitted occasionally for most cases and the power consumed by the MTC terminal has to be small. The MTC terminal may stay in a Discontinuous Reception (DRX) state for most of the time. In case a subframe for RRM measurement is transmitted while the MTC terminal is in the DRX state, the MTC terminal may hold the DRX state continuously without carrying out the RRM measurement. In other words, the DRX state can have a higher priority than the RRM measurement.

As another example, suppose a subframe for the RRM measurement is transmitted non-periodically to the MTC terminal in the DRX state. In this case, the MTC terminal receives the subframe for measurement, performs the RRM measurement, and then maintains the DRX state again.

The MTC terminal can be operated based on the limited power such as a battery. Therefore, it is important to reduce the overall consumption power in operating the MTC terminal. In the case of the MTC terminal, the amount of uplink data to be transmitted may be larger than the amount of downlink data to be received. Therefore, most of the power consumed by the MTC terminal may be used for transmitting traffic data through uplink transmission while the downlink transmission is used for receiving control data.

In the current LTE system, a terminal is unable to know allocation information of the PDSCH data transmitted to the terminal until the terminal decodes the PDCCH or the EPDCCH. Therefore, in case the terminal is not in the DRX state, the terminal has to perform decoding of a downlink subframe to determine whether the information transmitted to the terminal is present in the subframe. In case the MTC terminal continuously demodulates the data transmitted through a downlink channel, unnecessary power consumption may occur. And this may be a problem for the MTC terminal intended to operate with low power consumption.

The MTC terminal can receive data occasionally through a downlink channel. Therefore, according to the embodiment of the present invention, in case the MTC terminal is not in the DRX state, the MTC terminal may fix the subframe for which the MTC terminal has to perform demodulation. The information about the subframe for which the MTC terminal has to perform demodulation can be transmitted through upper layer signaling, for example. By using such a method, the MTC terminal can reduce power consumption by maintaining the DRX state when the MTC terminal is not in the timing of downlink subframe transmission or when uplink data transmission is not scheduled.

In case an NCT subframe is used, a Tracking Reference Signal (TRS) can be transmitted at particular time intervals (5 ms). The TRS may be a reference signal used for frequency tracking. The NCT subframe can be a carrier type implemented being optimized for a small-sized cell unit such as a small cell or a macro cell. The NCT subframe can reduce the overhead due to a reference signal which is a problem for an existing legacy subframe. The NCT subframe may be formed by a subframe to which all or part of the information transmitted through a signal and a channel in the existing LTE system is not transmitted. For example, the NCT subframe may not include the information such as the PDCCH data and the CRS. In the NCT subframe, the downlink control information such as the DCI can be transmitted through a channel such as the EPDCCH. By using the NCT subframe, interference among a plurality of cells can be diminished and carrier extensibility can be improved.

Ten subframes constituting the NCT frame can be indexed by NCT subframe 0 to NCT subframe 9. In this case, the TRS can be transmitted from the sbuframe 0 to 5 while the TRS is not transmitted through the subframe 1 to 4 and through the subframe 6 to 9. In other words, by specifying the NCT subframe through which the TRS is transmitted, the information about configuration of the NCT frame may not be transmitted separately. The configuration of the NCT subframe through which the TRS of the NCT frame is transmitted can be applied to legacy terminals as well as the MTC terminals.

In case the MTC terminal is in a sleep mode, a relay or a repeater can be used as a proxy to transmit downlink data to the MTC terminal. In other words, in case the MTC terminal switches to an active state, a relay or a repeater can be used as a proxy to transmit data to the MTC terminal.

Figure 15:
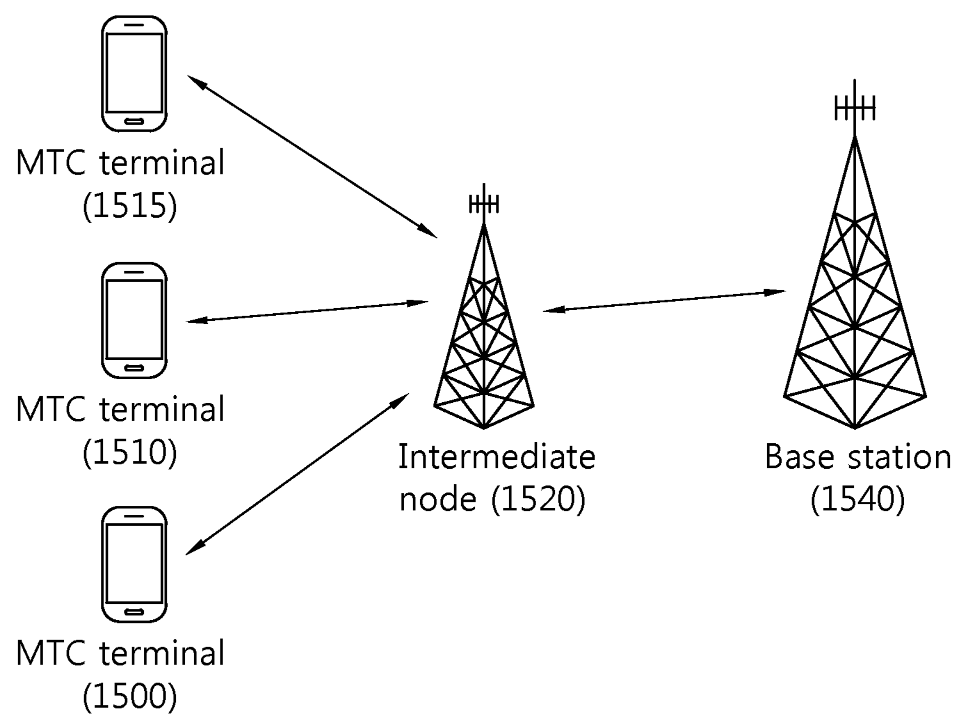
FIG. 15 illustrates a method for transmitting uplink data from an MTC terminal to a base station according to an embodiment of the present invention.

FIG. 15 illustrates a method for transmitting uplink data from an MTC terminal to a base station according to an embodiment of the present invention.

FIG. 15 discloses a method for transmitting uplink data transmitted from a plurality of MTC terminals 1500, 1510, 1515 by aggregating the data through an intermediate node 1520.

With reference to FIG. 15, for the MTC terminal 1500, 1510, 1515 to reduce power consumption involved in performing uplink transmission, multi-hop forwarding based on Device-to-Device (D2D) or proxy communication can be used. Instead of transmitting uplink data immediately, the uplink data transmitted from a plurality of MTC terminals 1500, 1510, 1515 can be aggregated by processing the data based on an intermediate forwarder 1520. By aggregation of uplink data transmitted from a plurality of MTC terminals 1500, 1510, 1515, the size of the data transmitted to a base station can be reduced.

Two methods as shown below can be used to determine power level of uplink transmission destined to a proxy or an intermediate node 1520 by the MTC terminals 1500, 1510, 1515.

(1) Power level for transmitting and receiving data between the MTC terminals 1500, 1510, 1515 and an intermediate node 1520 can be determined on the basis of an independent power control loop.

(2) The base station 1540 can inform the MTC terminals 1500, 1510, 1515 about information of a power offset. The information of a power offset may represent the difference between the case where the MTC terminals 1500, 1510, 1515 transmit uplink data directly to the base station 1540 and the case where the MTC terminals 1500, 1510, 1515 transmit uplink data to the intermediate node 1520. The MTC terminals 1500, 1510, 1515 can determine based on the information about a received power offset as to whether to transmit uplink data to the intermediate node 1520 or to the base station 1540.

The method (1) can be used when a relay is used as the intermediate node 1520. The method (2) may additionally require the information about the distance between the MTC terminals 1500, 1510, 1515 and the intermediate node 1520.

Figure 16:
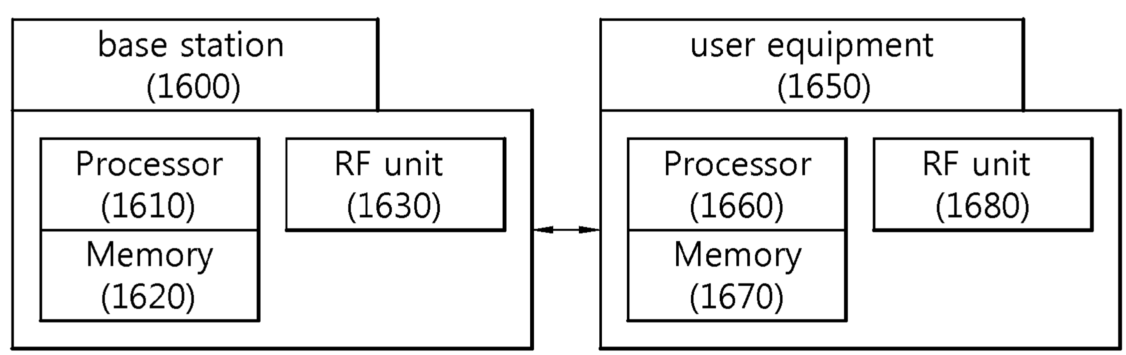
FIG. 16 illustrates a block diagram of a wireless communication system according to an embodiment of the present invention.

FIG. 16 illustrates a block diagram of a wireless communication system according to an embodiment of the present invention.

With reference to FIG. 16, the base station 1600 comprises a processor 1610, a memory 1620, and a Radio Frequency (RF) unit 1630. The memory 1620, being connected to the processor 1610, stores various kinds of information for operating the processor 1610. The RF unit 1620, being connected to the processor 1610, transmits and/or receives a radio signal. The processor 1610 implements a proposed function, a process and/or a method. In the previous embodiment, the operation of the base station can be implemented by the processor 1610.

For example, the processor 1610 can transmit resource allocation information to the terminal. The resource allocation information may be the information about a plurality of sub-resource allocation units (for example, fragmented PRBs) included in one resource allocation unit (for example, PRB). Also, the base station can generate a reference signal included in each fragmented PRB on the basis of a sequence different the others.

The wireless device 1650 comprises a processor 1660, a memory 1670, and an RF unit 1680. The memory 1670, being connected to the processor 1660, stores various kinds of information for operating the processor 1660. The RF unit 1680, being connected to the processor 1660, transmits and/or receives a radio signal. The processor 1660 implements a proposed function, a process and/or a method. In the previous embodiment, the operation of the wireless device can be implemented by the processor 1660.

For example, the processor 1660 can be implemented to receive resource allocation information from the base station. The processor 1660 can obtain information about fragmented PRBs from the resource allocation information and demodulate the downlink data transmitted through the corresponding fragmented PRB.

The processor can include Application-Specific Integrated Circuit (ASIC), other chipsets, logical circuit and/or data processing device. The memory can include Read-Only Memory (ROM), Random Access Memory (RAM), flash memory, memory card, storage medium and/or other storage devices. The RF unit can include baseband circuit to process a radio signal. If an embodiment is implemented by software, the techniques described above can be implemented in the form of a module (process or function) which performs the function described above. A module is stored in the memory and can be executed by the processor. The memory can be located inside or outside the processor and can be connected to the processor through a well-known means.

In the embodiments described above, although methods have been described through a series of steps or a block diagram, the present invention is not limited to the order of steps and some step can be carried out in a different order and as a different step from what has been described above, or some step can be carried out simultaneously with other steps. Also, it should be understood by those skilled in the art that those steps described in the flow diagram are not exclusive; other steps can be incorporated to those steps; or one or more steps of the flow diagram can be removed without affecting the technical scope of the present invention.

What is claimed is:

1. A method for a terminal to receive downlink data, the method comprising:

receiving resource allocation information from a base station; and demodulating downlink data transmitted through a sub-resource allocation unit allocated based on the resource allocation information, wherein a resource allocation unit includes the sub-resource allocation unit and an additional sub-resource allocation unit, wherein the resource allocation unit is a physical resource block (PRB), wherein the PRB includes seven orthogonal frequency division multiplexing (OFDM) symbols and 12 subcarriers, wherein the sub-resource allocation unit includes a resource for a first demodulation-reference signal (DM-RS), wherein the additional sub-resource allocation unit includes a resource for a second DM-RS, wherein the first DM-RS is generated based on a first DM-RS sequence, wherein the second DM-RS is generated based on a second DM-RS sequence, wherein a pattern of the first DM-RS is determined based on the first DM-RS sequence, wherein a pattern of the second DM-RS is determined based on the second DM-RS sequence, and wherein an initial value of a pseudo random sequence for generating each of the first DM-RS sequence and the second DM-RS sequence is determined as follows:

$$c_{init}=(\lfloor n_s/2\rfloor+1)\cdot(2n_{ID,i}^{EPDCCH}+1)\cdot 2^{16}+n_{SCID}^{EPDCCH}+k,$$

where $n_{SCID}^{EPDCCH}=2$; $n_{ID,i}^{EPDCCH}$ is determined by an upper layer; $n_s$ is a slot index; and k is determined by an index of the sub-resource allocation unit when the initial value of the pseudo random sequence is for the first DM-RS and the k is determined by an index of the additional sub-resource allocation unit when the initial value of the pseudo random sequence is for the second DM-RS.

2. The method of claim 1, wherein the terminal supports 1.4 MHz of operating bandwidth.

3. The method of claim 2, wherein each of the sub-resource allocation unit and the additional sub-resource allocation unit is a resource unit divided based on OFDM symbols included in the resource allocation unit.

4. A terminal for receiving downlink data in a wireless communication system, the terminal comprising:

a radio frequency (RF) unit configured to transmit or receive a radio signal; and a processor operatively connected to the RF unit and configured to:

receive resource allocation information from a base station, and demodulate downlink data transmitted through a sub-resource allocation unit allocated on the basis of the resource allocation information, wherein a resource allocation unit includes the sub-resource allocation unit and an additional sub-resource allocation unit, wherein the resource allocation unit is a physical resource block (PRB), wherein the PRB includes seven orthogonal frequency division multiplexing (OFDM) symbols and 12 subcarriers, wherein the sub-resource allocation unit includes a resource for a first demodulation-reference signal (DM-RS), wherein the additional sub-resource allocation unit includes a resource for a second DM-RS, wherein the first DM-RS is generated based on a first DM-RS sequence, wherein the second DM-RS is generated based on a second DM-RS sequence, wherein a pattern of the first DM-RS is determined based on the first DM-RS sequence, wherein a pattern of the second DM-RS is determined based on the second DM-RS sequence, and wherein an initial value of a pseudo random sequence for generating each of the first DM-RS sequence and the second DM-RS sequence is determined as follows:

$$c_{init}=(\lfloor n_s/2\rfloor+1)\cdot(2n_{ID,i}^{EPDCCH}+1)\cdot 2^{16}+n_{SCID}^{EPDCCH}+k,$$

where $n_{SCID}^{EPDCCH}=2$; $n_{ID,i}^{EPDCCH}$ is determined by an upper layer; $n_s$ is a slot index; and k is determined by an index of the sub-resource allocation unit when the initial value of the pseudo random sequence is for the first DM-RS and the k is determined by an index of the additional sub-resource allocation unit when the initial value of the pseudo random sequence is for the second DM-RS.

5. The terminal of claim 4, wherein the terminal supports 1.4 MHz of operating bandwidth.

6. The terminal of claim 5, wherein each of the sub-resource allocation unit and the additional sub-resource allocation unit is a resource unit divided based on OFDM symbols included in the resource allocation unit.

* * * * *